United States Patent
Jeon et al.

(10) Patent No.: US 10,072,211 B2
(45) Date of Patent: Sep. 11, 2018

(54) ALIGNMENT LAYER COMPOSITION, LIQUID CRYSTAL DISPLAY INCLUDING THE SAME, AND METHOD OF MANUFACTURING THE LIQUID CRYSTAL DISPLAY

(71) Applicant: Samsung Display Co. Ltd., Yongin-si, Gyeonggi-do (KR)

(72) Inventors: Jong Hwan Jeon, Hwaseong-si (KR); Suk Hoon Kang, Seoul (KR); In Ok Kim, Osan-si (KR); Baek Kyun Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/240,294

(22) Filed: Aug. 18, 2016

(65) Prior Publication Data

US 2017/0306235 A1    Oct. 26, 2017

(30) Foreign Application Priority Data

Apr. 20, 2016  (KR) .................. 10-2016-0047936

(51) Int. Cl.
*C09K 19/56* (2006.01)
*C08G 73/10* (2006.01)
(Continued)

(52) U.S. Cl.
CPC .......... *C09K 19/56* (2013.01); *C08G 73/1067* (2013.01); *C09K 19/34* (2013.01);
(Continued)

(58) Field of Classification Search
CPC .... C09K 19/56; C08G 73/10; C08G 73/1067; C08G 73/1007; C09D 179/08;
(Continued)

(56) References Cited

U.S. PATENT DOCUMENTS 5,061,509 A * 10/1991 Naito .................... C08G 73/10
                                                              427/497
6,063,829 A     5/2000 Endou et al.
(Continued)

FOREIGN PATENT DOCUMENTS

JP    2008-116809 A    5/2008
JP    2012-093642 A    5/2012
(Continued)

*Primary Examiner* — Ruiyun Zhang
(74) *Attorney, Agent, or Firm* — Cantor Colburn LLP

(57) ABSTRACT

An alignment layer composition including a copolymer of a dianhydride compound and a diamine compound, the copolymer including a repeating unit represented by chemical formula (1); and a repeating unit represented by chemical formula (2):

Chemical Formula (1)

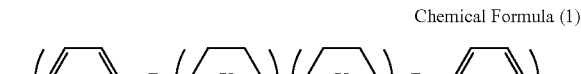

Chemical Formula (2)

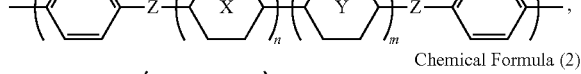

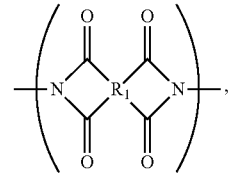

wherein $R_1$ is a tetravalent organic group derived from an alicyclic dianhydride or an aromatic dianhydride, and wherein $R_1$ includes a phenyl ester group.

15 Claims, 28 Drawing Sheets

(51) Int. Cl.
*G02F 1/1337* (2006.01)
*C09K 19/34* (2006.01)

(52) U.S. Cl.
CPC .... *G02F 1/13378* (2013.01); *G02F 1/133711* (2013.01); *G02F 1/133788* (2013.01); *Y10T 428/10* (2015.01); *Y10T 428/1018* (2015.01); *Y10T 428/1023* (2015.01)

(58) Field of Classification Search
CPC ........... G02F 1/133711; G02F 1/13378; G02F 1/133788; G02F 1/133723; Y10T 428/10; Y10T 428/1018; Y10T 428/1023
USPC ........ 428/1.1, 1.2, 1.25, 1.26; 349/123, 130, 349/132; 524/600, 602; 522/164; 528/350, 353
See application file for complete search history.

(56) References Cited

U.S. PATENT DOCUMENTS

| | | | |
|---|---|---|---|
| 2014/0024786 A1* | 1/2014 | Sohn | C08G 73/1067 525/426 |
| 2016/0070142 A1* | 3/2016 | Kang | C08G 73/10 349/43 |

FOREIGN PATENT DOCUMENTS

| | | |
|---|---|---|
| JP | 2014-029465 A | 2/2014 |
| JP | 2014-130366 A | 7/2014 |

\* cited by examiner

ALIGNMENT LAYER COMPOSITION, LIQUID CRYSTAL DISPLAY INCLUDING THE SAME, AND METHOD OF MANUFACTURING THE LIQUID CRYSTAL DISPLAY

This application claims priority to Korean Patent Application No. 10-2016-0047936 filed on Apr. 20, 2016, and all benefits accruing therefrom under 35 U.S.C. § 119, the disclosure of which in its entirety is herein incorporated by reference.

BACKGROUND

1. Field

The present disclosure relates to an alignment layer composition, a liquid crystal display (LCD) including the same, and a method of manufacturing the LCD.

2. Description of the Related Art

Liquid crystal displays (LCDs) are one of the most widely used types of flat panel displays. Generally, an LCD includes a pair of substrates having field generating electrodes, such as pixel electrodes and a common electrode, and a liquid crystal layer interposed between the two substrates.

In an LCD, voltage is applied to field generating electrodes to generate an electric field in a liquid crystal layer. Accordingly, the alignment direction of liquid crystal molecules of the liquid crystal layer is determined, and polarization of incident light is controlled. As a result, a desired image is displayed on the LCD.

To display an image on an LCD, liquid crystal molecules should be aligned in a specified direction at an interface between the liquid crystal molecules of a liquid crystal layer and a field generating electrode. The degree of uniformity in the alignment of the liquid crystal molecules is an important factor that determines the image quality of the LCD. Therefore, an alignment layer having anisotropy is formed between the liquid crystal layer and the field generating electrode to arrange the liquid crystal molecules in a direction.

SUMMARY

Aspects of the present disclosure provide an alignment layer composition which includes a new photo-alignment polymer material.

Aspects of the present disclosure also provide an alignment layer composition which can improve alignment properties and hardness of an alignment layer, reduce afterimage defects, and increase contrast ratio.

Aspects of the present disclosure further provide a liquid crystal display (LCD) including the above alignment layer composition and a method of manufacturing the LCD.

However, aspects of the present disclosure are not restricted to the embodiments set forth herein. The above and other aspects of the present disclosure will become more apparent to one of ordinary skill in the art to which the present disclosure pertains by referencing the detailed description of the present disclosure given below.

According to an exemplary embodiment, there is provided an alignment layer composition including, a copolymer of a dianhydride compound and a diamine compound, including:

a repeating unit represented by chemical formula (1); and a repeating unit represented by chemical formula (2):

Chemical Formula (1)

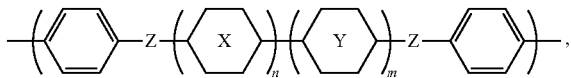

wherein

Z is an alkylene group having 2 to 8 carbon atoms,

X is an aromatic group having 6 to 30 carbon atoms or an alicyclic group having 4 to 20 carbon atoms, Y is an alicyclic group having 4 to 20 carbon atoms or an aromatic group having 6 to 30 carbon atoms, n is 0 or 1, and m is 1 or 0; and Chemical Formula (2)

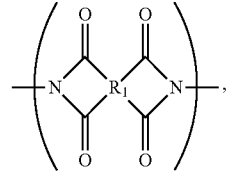

wherein $R_1$ is a tetravalent organic group derived from an alicyclic dianhydride or an aromatic dianhydride, and wherein $R_1$ includes a phenyl ester group.

In an exemplary embodiment, in chemical formula (1), m may be 0, n may be 1, and X may be an alicyclic group having 4 to 20 carbon atoms.

In an exemplary embodiment, in chemical formula (1), m may be 1, n may be 0, and Y may be an aromatic group having 6 to 30 carbon atoms.

In an exemplary embodiment, in chemical formula (1), each of n and m may be 1,

X may be an alicyclic group having 4 to 20 carbon atoms, and

Y may be an aromatic group having 6 to 30 carbon atoms.

In an exemplary embodiment, in chemical formula (1), each of n and m may be 1,

Y may be an alicyclic group having 4 to 20 carbon atoms, and

X may be an aromatic group having 6 to 30 carbon atoms.

In an exemplary embodiment, the copolymer may be represented by a repeating unit of chemical formula (3):

Chemical Formula (3)

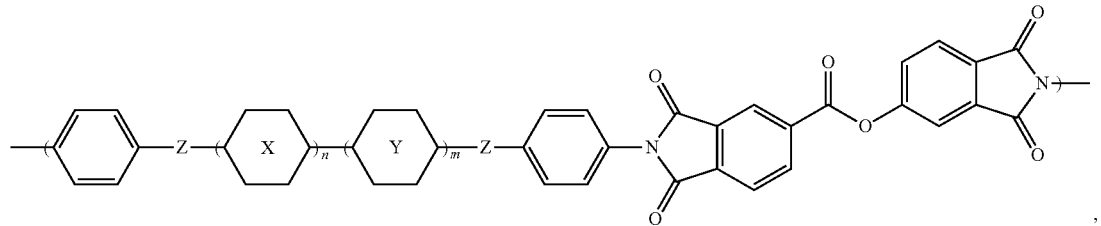

wherein Z, X, Y, n and m are identical to those in chemical formula (1).

In an exemplary embodiment, the ratio of the diamine compound and the dianhydride compound may be about 1:1.

According to another exemplary embodiment, there is provided a liquid crystal display (LCD) including:

a first substrate and a second substrate facing each other;

a first alignment layer disposed on a surface of the first substrate facing the second substrate;

a second alignment layer disposed on a surface of the second substrate facing the first substrate; and a liquid crystal layer interposed between the first substrate and the second substrate, wherein at least one of the first alignment layer and the second alignment layer includes a copolymer of a dianhydride compound and a diamine compound, having a repeating unit represented by chemical formula (1) and a repeating unit represented by chemical formula (2):

Chemical Formula (1)

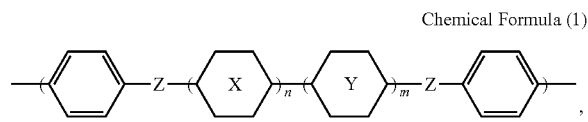

wherein

Z is an alkylene group having 2 to 8 carbon atoms, an aromatic group having 6 to 30 carbon atoms or an alicyclic group having 4 to 20 carbon atoms, Y is an alicyclic group having 4 to 20 carbon atoms or an aromatic group having 6 to 30 carbon atoms, n is 0 or 1, and
m is 1 or 0; and Chemical Formula (2)

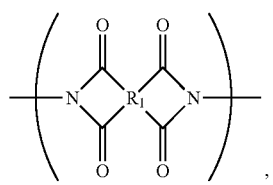

wherein $R_1$ is a tetravalent organic group derived from an alicyclic dianhydride or an aromatic dianhydride, and wherein $R_1$ includes a phenyl ester group.

In an exemplary embodiment, the chemical formula (2) may be represented by chemical formula (2-1):

Chemical Formula 2-1

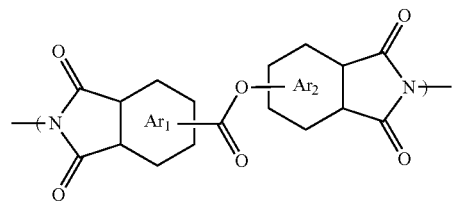

wherein $Ar_1$ and $Ar_2$ are each independently an aromatic group comprising 6 to 30 carbon atoms.

In an exemplary embodiment, the copolymer may be represented by a repeating unit of chemical formula (1-1):

Chemical Formula (1-1)

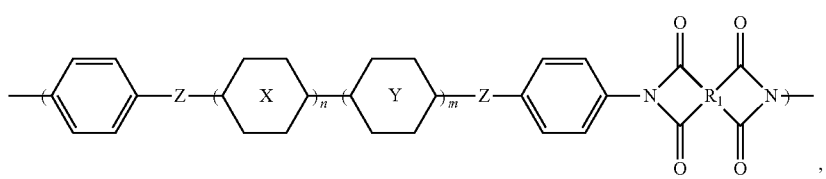

wherein Z, X, Y, $R_1$, n and m are identical to those in chemical formula (1).

In an exemplary embodiment, the copolymer may be represented by a repeating unit of chemical formula (3-1):

Chemical Formula (3-1)

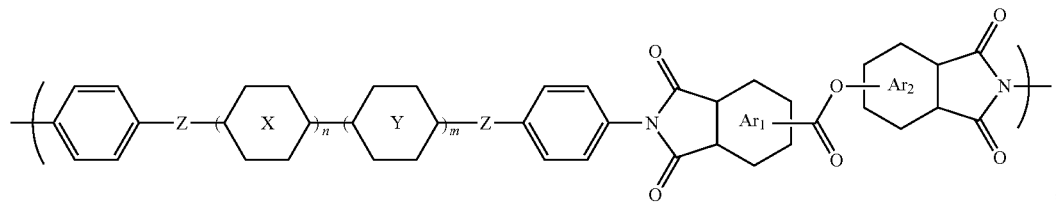

wherein

Z, X, Y, n and m are identical to those in chemical formula (1), and $Ar_1$ and $Ar_2$ are each independently an aromatic group comprising 6 to 30 carbon atoms.

In an exemplary embodiment, the copolymer may include a repeating unit represented by chemical formula (3):

Chemical Formula (3)

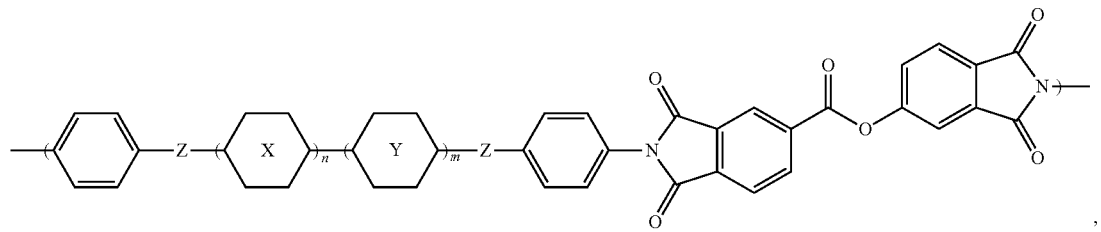

wherein Z, X, Y, n and m are identical to those in chemical formula (1).

In an exemplary embodiment, the copolymer may further include a repeating unit of chemical formula (4-1):

Chemical Formula (4-1)

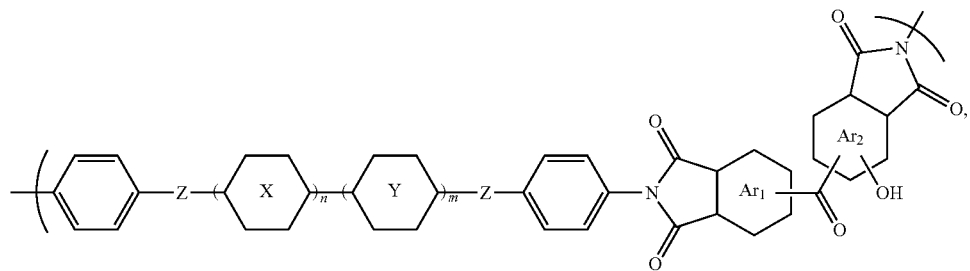

wherein Z, X, Y, $R_1$, $Ar_1$, $Ar_2$, n and m are identical to those in chemical formula (3-1).

In an exemplary embodiment, the copolymer may further include a repeating unit represented by chemical formula (4):

Chemical Formula (4)

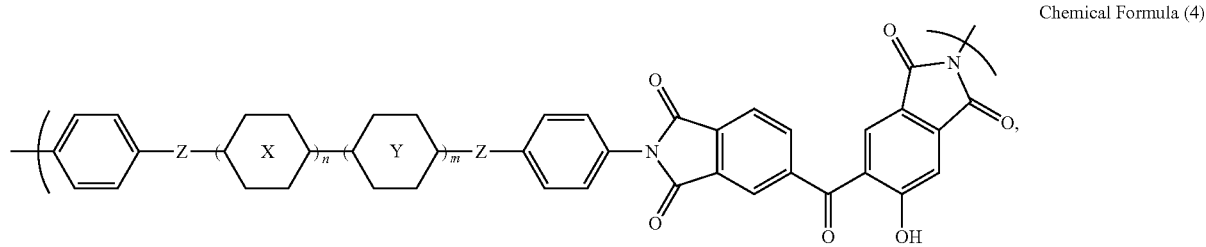

wherein Z, X, Y, n and m are identical to those in chemical formula (1).

In an exemplary embodiment, the amount of the copolymer including a repeating unit of chemical formula (4-1) may be from about 5 mole percent to about 30 mole percent based on the total amount of the repeating unit of chemical formula (3-1) and the repeating unit of chemical formula (4-1).

According to yet another exemplary embodiment, there is provided a method of manufacturing an LCD, the method including:

providing a substrate;
disposing an alignment layer composition on the substrate;
irradiating the alignment layer composition with linearly polarized light to the alignment layer composition; and
heat-treating the alignment layer composition,
wherein the alignment layer composition includes a copolymer of a dianhydride compound and a diamine compound, including a repeating unit represented by chemical formula (1) and a repeating unit represented by chemical formula (2):

Chemical Formula (1)

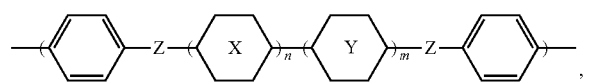

wherein

Z is an alkylene group having 2 to 8 carbon atoms,
X is an aromatic group having 6 to 30 carbon atoms or an alicyclic group having 4 to 20 carbon atoms,
Y is an alicyclic group having 4 to 20 carbon atoms or an aromatic group having 6 to 30 carbon atoms,
n is 0 or 1, and
m is 1 or 0; and Chemical Formula (2)

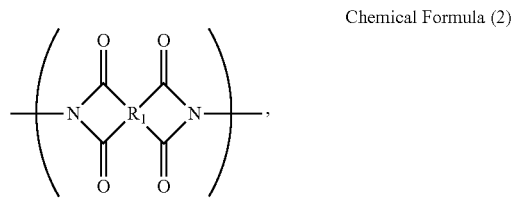

wherein $R_1$ is a tetravalent organic group derived from an alicyclic dianhydride or an aromatic dianhydride, and wherein $R_1$ includes a phenyl ester group.

In an exemplary embodiment, the copolymer may include a repeating unit represented by chemical formula (3):

Chemical Formula (3)

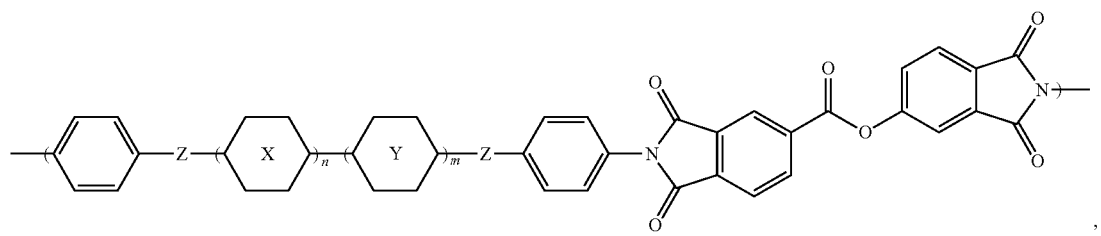

wherein Z, X, Y, n and m are identical to those in chemical formula (1).

In an exemplary embodiment, at least one of the repeating unit represented by chemical formula (3) may be converted to a repeating unit represented by chemical formula (4) by the irradiating the alignment layer composition with the linearly polarized light:

Chemical Formula (4)

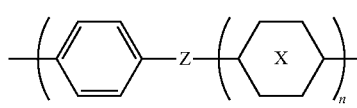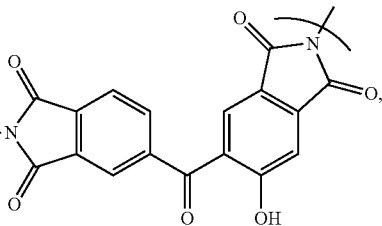

wherein Z, X, Y, n and m are identical to those in chemical formula (1).

In an exemplary embodiment, the at least one of the repeating unit represented by chemical formula (3) in a polarization direction of the linearly polarized light may be converted to the repeating unit represented by chemical formula (4).

In an exemplary embodiment, the heat-treating of the alignment layer composition may be performed in a temperature range of 210 to 240° C. for 20 to 45 minutes.

In an exemplary embodiment, the method may further include pre-treating the alignment layer composition in a temperature range of 60 to 80° C. for 50 to 100 seconds before the irradiating of the linearly polarized light.

An alignment layer composition according to an embodiment can provide a photo-alignment layer having anisotropy given by a new photoreaction.

In addition, it is possible to provide an alignment layer composition which can improve alignment properties and hardness of an alignment layer, reduce afterimage defects and increase contrast ratio and a liquid crystal display including the alignment layer composition.

Further, a method of manufacturing the liquid crystal display can be provided.

However, the effects of the present inventive concept are not restricted to the embodiments set forth herein. The above and other effects of the present inventive concept will become more apparent to one of daily skill in the art to which the present disclosure pertains by referencing to the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
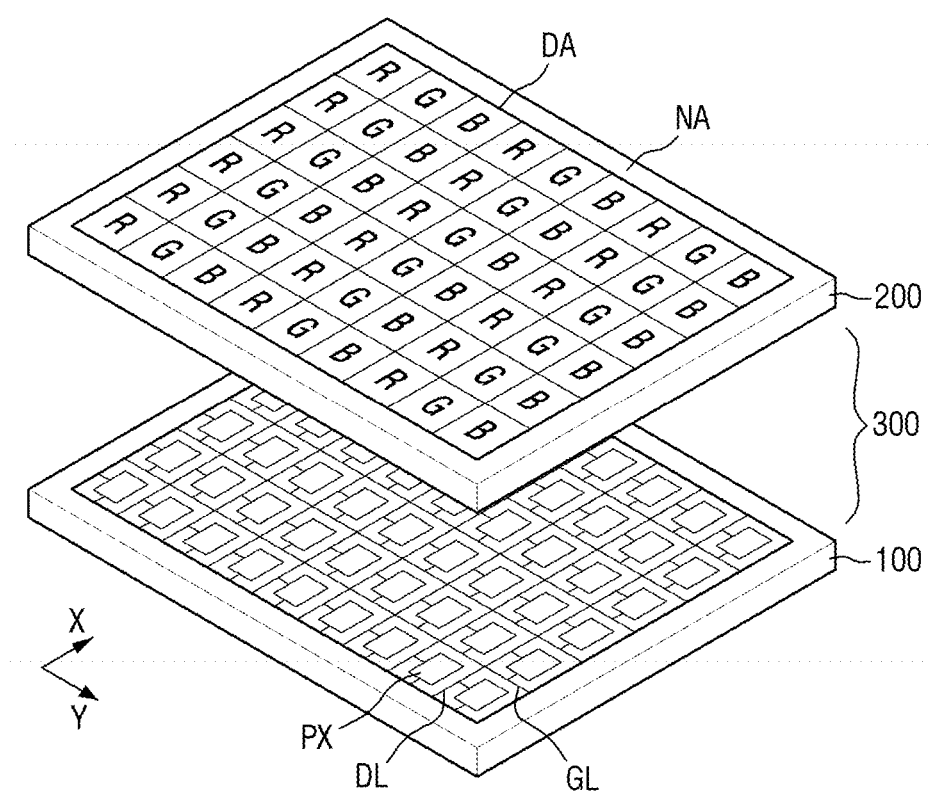
FIG. 1 is a schematic exploded perspective view of a liquid crystal display (LCD) according to an embodiment.

Features of the inventive concept and methods of accomplishing the same may be understood more readily by reference to the following detailed description of preferred embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "bottom," "below," "lower," "under," "above," "upper," "top" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value."

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The present inventive concept will now be described more fully with reference to the accompanying drawings, in which exemplary embodiments of the inventive concept are shown.

FIG. 1 is a schematic exploded perspective view of a liquid crystal display (LCD) according to an embodiment.

Referring to FIG. 1, an LCD manufactured according to an embodiment includes a first substrate 100, a first alignment layer (not illustrated) which is disposed on the first substrate 100, a second substrate 200 which is separated from to face the first substrate 100, and a liquid crystal layer 300 which is interposed between the first substrate 100 and the second substrate 200. The first substrate 100 may be a lower display substrate, and the second substrate 200 may be an upper display substrate.

Each of the first substrate 100 and the second substrate 200 includes a display area DA and a non-display area NA. The display area DA is an area in which an image is displayed, and the non-display area NA is an area in which no image is displayed. The display area DA is surrounded by the non-display area NA.

The display area DA includes a plurality of data lines DL extending in a first direction x (e.g., a column direction), a plurality of gate lines GL extending in a second direction y (e.g., a row direction) intersecting the first direction x, and a plurality of pixels PX formed at intersections of the gate lines GL and the data lines DL. The pixels PX may be arranged in the first direction x and the second direction y in a substantially matrix pattern.

Each of the pixels PX may uniquely display one of primary colors. The primary colors may be, for example, red, green, and blue.

The non-display area NA may be a light-blocking area. A driver (not illustrated) which provides gate driving signals, data driving signals, etc. to the pixels PX of the display area DA may be disposed in the non-display area NA of the first substrate 100. The gate lines GL and the data lines DL may extend from the display area DA to the non-display area NA and may be electrically connected to the driver.

The liquid crystal layer 300 may be interposed between the first substrate 100 and the second substrate 200. The liquid crystal layer 300 may include liquid crystal molecules LC having positive dielectric anisotropy. However, the present disclosure is not limited thereto, and the liquid crystal layer 300 can also include liquid crystal molecules having negative dielectric anisotropy.

Components of the LCD according to the current embodiment will now be described in greater detail.

Figure 2:
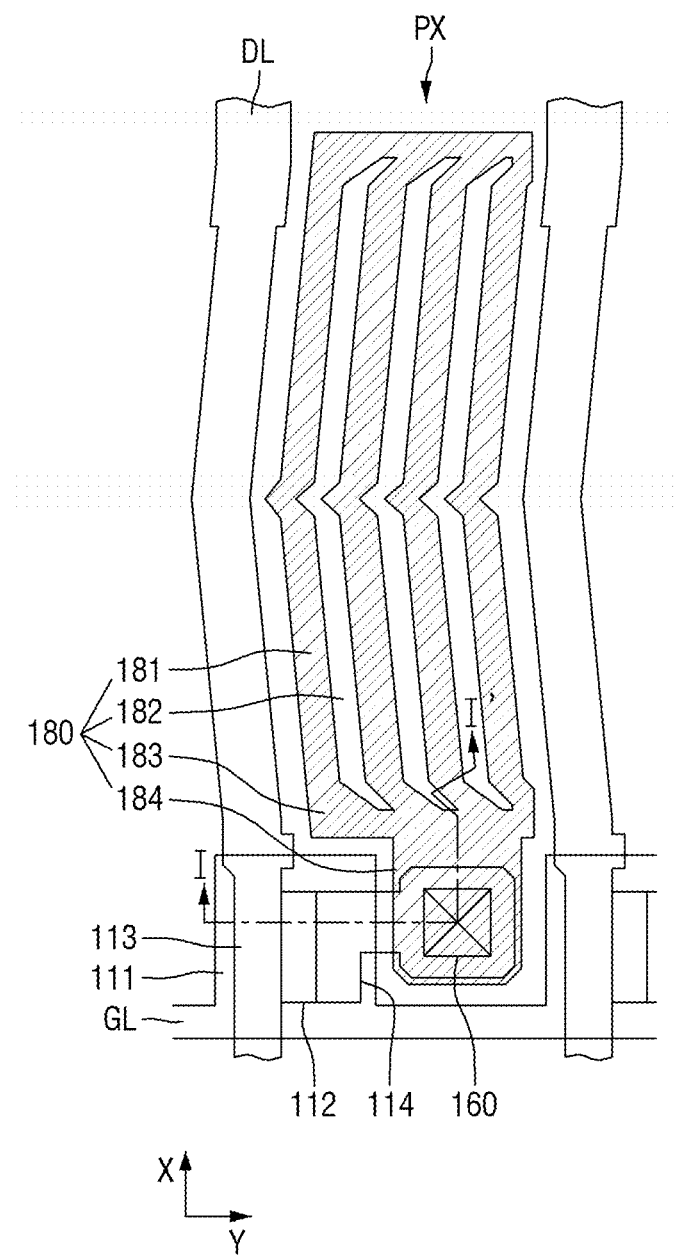
FIG. 2 is a schematic layout view of a pixel included in the LCD of FIG. 1.
Figure 3:
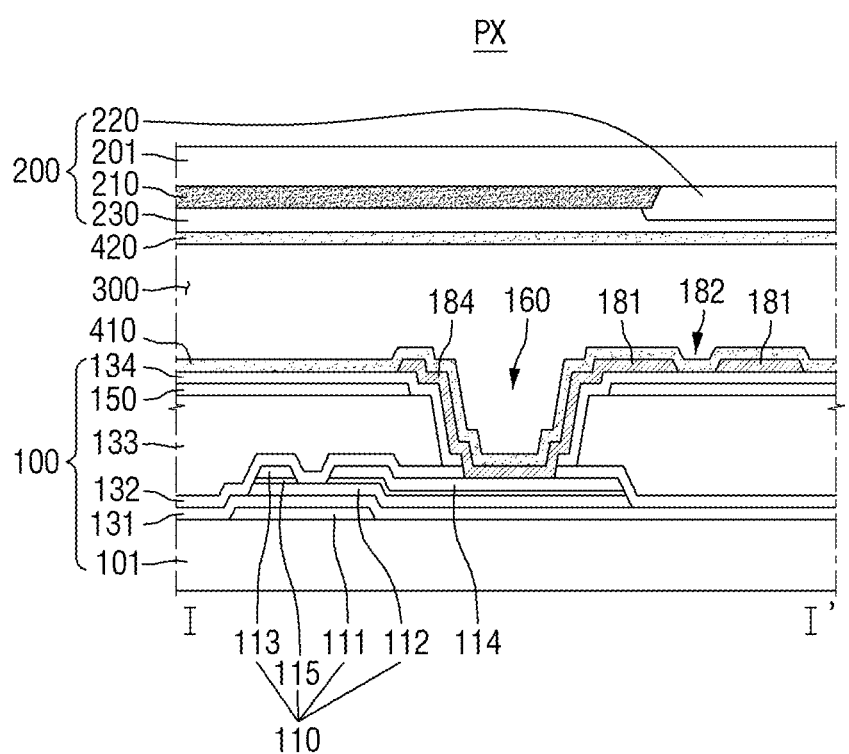
FIG. 3 is a cross-sectional view taken along the line I-I' of FIG. 2.

FIG. 2 is a schematic plan view of a pixel included in the LCD of FIG. 1. FIG. 3 is a cross-sectional view taken along the line I-I' of FIG. 2.

Referring to FIGS. 2 and 3, the first substrate 100 includes a first base substrate 101, one or more thin-film transistors (TFTs) 110, a common electrode 150, a pixel electrode 180, and a plurality of passivation/insulation layers.

A gate wiring layer may be disposed on the first base substrate 101. The gate wiring layer may include a gate line GL and a gate electrode 111.

The gate line GL may extend along substantially the second direction y. The gate electrode 111 may protrude upward from the gate line GL. The gate electrode 111 and the gate line GL may be integrally formed with each other without a physical boundary therebetween. A gate signal received through the gate line GL may be provided to the gate electrode 111.

A first insulation layer 131 may be disposed on the gate wiring layer and over the whole surface of the first base substrate 101. The first insulation layer 131 may be made of an insulating material to electrically insulate a layer located thereon and a layer located thereunder. The first insulation layer 131 may have a multilayer structure including at least two insulation layers having different physical characteristics.

A semiconductor layer 112 is disposed on the first insulation layer 131. At least a portion of the semiconductor layer 112 is disposed in an area which overlaps the gate electrode 111. The semiconductor layer 112 may serve as a channel of a TFT 110 and turn on or off the channel according to a voltage provided to the gate electrode 111.

A data wiring layer may be disposed on the semiconductor layer 112. The data wiring layer may include a data line DL, a source electrode 113, and a drain electrode 114.

The data line DL may extend along substantially the first direction x to intersect the gate line GL. A data signal may be transmitted to the data line DL. A pixel area PX may be defined at an intersection of the data line DL and the gate line GL.

The source electrode 113 and the drain electrode 114 may be disposed on the gate electrode 111 and the semiconductor layer 112 to be separated from each other. The source electrode 113 may be integrally formed with the data line DL without a physical boundary therebetween. In the drawings including FIG. 2, the source electrode 113 is a part of the data line DL. However, the source electrode 113 can also protrude from the data line DL toward the gate electrode 111. The drain electrode 114 may be electrically connected to the pixel electrode 180 by a contact hole 160 which will be described later.

An ohmic contact layer 115 may be disposed between the semiconductor layer 112 and the data wiring layer. The ohmic contact layer 115 may be made of an n+ hydrogenated amorphous silicon material heavily doped with an n-type impurity or may be made of silicide.

A passivation layer 132 may be disposed on the data wiring layer and over the whole surface of the first base substrate 101. The passivation layer 132 may be made of an inorganic layer and have a single-layer structure or a multilayer structure. The passivation layer 132 can prevent wiring layers and electrodes formed thereunder from being exposed and thus directly contacting an organic material. A planarization layer 133 is disposed on the passivation layer 132 and over the whole surface of the first base substrate 101. The planarization layer 133 may be made of an organic material. The planarization layer 133 can be made of a plurality of components stacked on the first base substrate 101 and having equal heights.

The common electrode 150 may be disposed on the planarization layer 133. The common electrode 150 may be a transparent electrode. A common electrode is applied to the common electrode 150. The common electrode 150 forms an electric field together with the pixel electrode 180 to which a data voltage is applied, thereby controlling the alignment direction of the liquid crystal molecules LC in the liquid crystal layer 300. A second insulation layer 134 may be disposed on the common electrode 150 to insulate the common electrode 150 thereunder from the pixel electrode 180 thereon.

The contact hole 160 may be formed in the passivation layer 132, the planarization layer 133, and the second insulation layer 134 to partially expose the drain electrode 114. The drain electrode 114 may be electrically connected to the pixel electrode 180 by the contact hole 160.

The pixel electrode 180 is disposed on the second insulation layer 134 in the pixel area PX and on a portion of the drain electrode 114 which is exposed by the control hole 160. Like the common electrode 150, the pixel electrode 180 may be a transparent electrode.

The pixel electrode 180 may be a patterned electrode including a plurality of branch electrodes 181, a plurality of slits 182, each being formed between adjacent branch electrodes 181, a connecting electrode 183 which connects the branch electrodes 181 at at least one end of the branch electrodes 181, and a protruding electrode 184 which protrudes from the connecting electrode 183 toward the contact hole 160.

The branch electrodes 181 and the slits 182 may be shaped like bent bars which are symmetrical with respect to roughly a central part of the pixel area PX. At least two domains may be formed in one pixel area. Accordingly, this may cause long axes of the liquid crystal molecules LC to be disposed differently in each domain, thereby suppressing a color shift phenomenon at a certain azimuthal angle. The protruding electrode 184 may be electrically connected to the drain electrode 114 by the contact hole 160 and receive a data voltage from the drain electrode 114. The connecting electrode 183 may connect the protruding electrode 184 and the branch electrodes 181. Thus, the connecting electrode 183 can evenly provide a voltage received from the protruding electrode 184 to the branch electrodes 181.

A first alignment layer 410 may be disposed on the first substrate 100. The first alignment layer 410 may be a horizontal alignment layer. In this case, the first alignment layer 410 may have anisotropy and cause the long axes of the liquid crystal molecules LC in the liquid crystal layer 300 adjacent to the first alignment layer 410 to face a certain direction in a plane. In addition, the first alignment layer 410 may be a photoalignment layer made of a material containing a photoreactive functional group that can induce a photoreaction. The first alignment layer 410 will be described in detail later together with a second alignment layer 420.

The second substrate 200 will now be described. The second substrate 200 may include a second base substrate 201, a light-blocking member 210, a color filter 220, and an overcoat layer 230.

Like the first base substrate 101, the second base substrate 201 may be a transparent insulating substrate. The light-blocking member 210 is disposed on the second base substrate 201. The light-blocking member 210 may be, for example, a black matrix. The light-blocking member 210 may be disposed in a boundary area between a plurality of pixel areas, that is, in an area that overlaps the data lines DL and the gate lines GL and an area that overlaps the TFT 110. In other words, the light-blocking member 210 may be disposed at a boundary between adjacent pixel areas PX through which light incident from a backlight unit (not illustrated) under the first substrate 100 is transmitted substantially. Hence, the light-blocking member 210 can prevent the intended mixing of colors or the leakage of light.

The color filter 220 may be disposed on the light-blocking member 210 in an area that overlaps the pixel area PX. The color filter 220 may transmit light of a particular wavelength band only. The color filter 220 may be disposed between two neighboring data lines DL and occupy most of the pixel area PX in a plane. Color filters which have different colors and transmit light of different wavelength bands may be disposed in adjacent pixel areas. Alternatively, no color filters may be disposed. In FIGS. 2 and 3, the color filter 220 has a color filter-on-array structure in which a color filter is disposed on a TFT. However, the color filter 220 can also be disposed under the TFT 110 or on the first substrate 100.

The overcoat layer 230 is disposed on the light-blocking member 210 and the color filter 220 and over the whole surface of the second base substrate 201. The overcoat layer 230 may be an organic layer made of an organic material. The overcoat layer 230 can prevent the light-blocking member 210 and the color filter 220 from moving out of position from the second base substrate 201 and can be made of components stacked on the second base substrate 201 and having uniform heights. In addition, the overcoat layer 230 can prevent defects (such as afterimages) which may occur during screen driving by suppressing the liquid crystal layer 300 from being contaminated by a compound such as a solvent introduced from the color filter 220.

The second alignment layer 420 may be disposed on the second substrate 200. Like the first alignment layer 410, the second alignment layer 420 may be a horizontal alignment layer. The first alignment layer 410 and the second alignment layer 420 will hereinafter be described in detail.

The first alignment layer 410 and/or the second alignment layer 420 may be formed using an alignment layer composition.

The alignment layer composition is a copolymer of a dianhydride compound and a diamine compound. The alignment layer composition may be a copolymer made of a polyamic acid having a photoreactive group in a repeating unit, a polymer obtained by partial imidization of the polyamic acid having a photoreactive group in a repeating unit, polyimide obtained by dehydrative cyclization of the polyamic acid having a photoreactive group in a repeating unit, or a combination thereof.

The copolymer of the alignment layer composition includes a repeating unit derived from a diamine compound and represented by formula (1) below:

Chemical Formula (1)

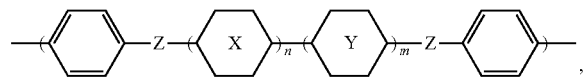

wherein

Z is an alkylene group having 2 to 8 carbon atoms,

X is an aromatic group having 6 to 30 carbon atoms or an alicyclic group having 4 to 20 carbon atoms, Y is an alicyclic group having 4 to 20 carbon atoms or an aromatic group having 6 to 30 carbon atoms, n is 0 or 1, and m is 1 or 0.

In addition, the copolymer of the alignment layer composition includes a repeating unit having a photoreactive phenyl ester group (—C(=O)—O—). The repeating unit having a photoreactive group may be derived from a dianhydride compound.

In the copolymer of the alignment layer composition, the repeating unit including a photoreactive phenyl ester group has a structure represented by formula (2) below:

Chemical Formula (2)

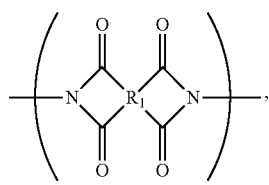

wherein $R_1$ is a tetravalent organic group derived from an alicyclic dianhydride or an aromatic dianhydride, and wherein $R_1$ includes a phenyl ester group.

In an exemplary embodiment, the chemical formula (2) may be represented by chemical formula (2-1):

Chemical Formula 2-1

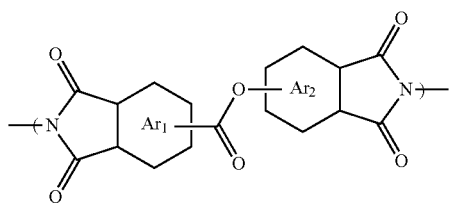

wherein $Ar_1$ and $Ar_2$ are each independently an aromatic group comprising 6 to 30 carbon atoms.

In an embodiment, the repeating unit of formula (2) undergoes photorearrangement as a result of the Fries photoreaction, thus causing the liquid crystal molecules LC to be arranged in one direction. This will be described in greater detail later.

In chemical formula (1) above, n and m may be 1, X may be an alicyclic group having 4 to 20 carbon atoms, and Y may be an aromatic group having 6 to 30 carbon atoms. Alternatively, in chemical formula (1), n and m may be 1, Y may be an alicyclic group having 4 to 20 carbon atoms, and X may be an aromatic group having 6 to 30 carbon atoms.

In an embodiment, in chemical formula (1), m may be 1, n may be 0, and Y may be an aromatic group having 6 to 30 carbon atoms. In another embodiment, in chemical formula (1), m may be 0, n may be 1, and X may be an alicyclic group having 4 to 20 carbon atoms.

Chemical formulas (1) and (2) may be combined with each other and repeated. As in chemical formula (1), a chain-like group such as Z may be included in a repeating unit so as to provide fluidity in an alignment layer. In addition, an aromatic or alicyclic groups such as X or Y may be included in chemical formula (1) to increase the alignment capability by increasing the interaction between an alignment layer and liquid crystals, enhance black luminance, and reduce an alternating current (AC) afterimage effect. Further, packability within the alignment layer may be increased using X or Y, thereby improving the hardness of the alignment layer.

The ratio of the repeating unit represented by formula (1) and the repeating unit represented by formula (2) may be about one to one. In an embodiment, the repeating unit of formula (1) is originated from a diamine compound, and the repeating unit of formula (2) is originated from a dianhydride compound. The ratio of the diamine compound and the dianhydride compound may be about 1:1.

In an exemplary embodiment, the copolymer may be represented by a repeating unit of chemical formula (1-1):

Chemical Formula (1-1)

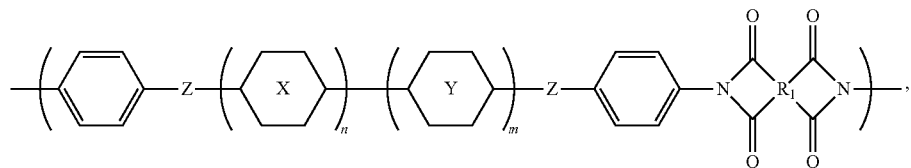

wherein Z, X, Y, R$_1$, n and m are identical to those in chemical formula (1). In another exemplary embodiment, the copolymer may be represented by a repeating unit of chemical formula (3-1):

Chemical Formula (3-1)

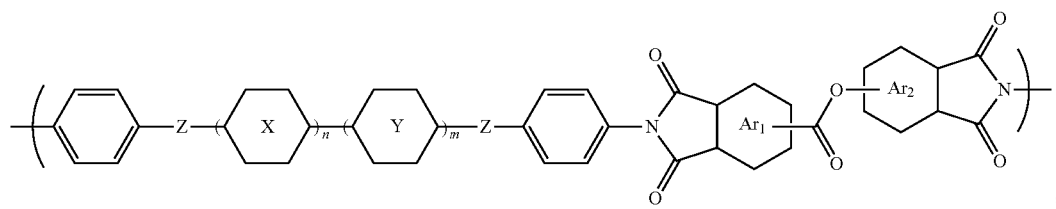

wherein
Z, X, Y, n and m are identical to those in chemical formula (1), and
Ar$_1$ and Ar$_2$ are each independently an aromatic group comprising 6 to 30 carbon atoms.

In a non-restrictive example, the copolymer may be represented by a repeating unit of chemical formula (3) below:

Chemical Formula (3)

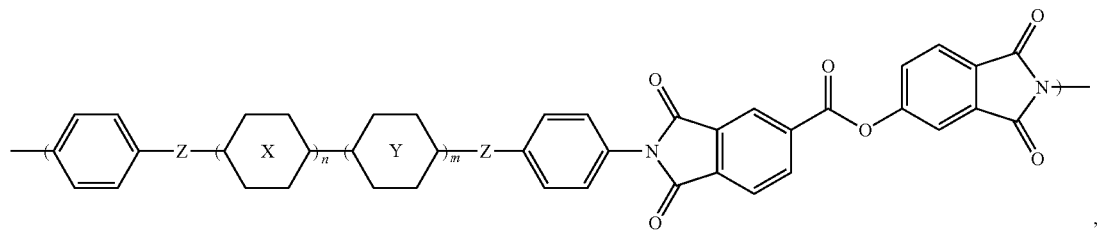

where Z, X, Y, n and m are identical to those in chemical formula (1) above.

In an exemplary embodiment, the copolymer may further include a repeating unit of chemical formula (4-1):

Chemical Formula (4-1)

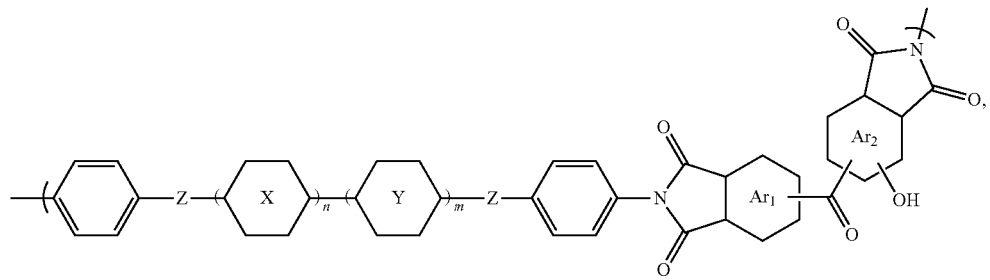

wherein Z, X, Y, R$_1$, Ar$_1$, Ar$_2$, n and m are identical to those in chemical formula (3-1).

In an exemplary embodiment, the amount of the copolymer including a repeating unit of chemical formula (4-1) may be from about 5 mole percent to about 30 mole percent based on the total amount of the repeating unit of chemical formula (3-1) and the repeating unit of chemical formula (4-1).

In the repeating unit of chemical formula (3), a photoreaction may occur as follows. While not wishing to be bound by theory, it is understood that, in the structure of chemical formula (3), a C—O bond in an O=C—O bond may be homolytically cleaved by absorption of polarized light to form an acyl radical O=C. and a quinone-like aromatic radical system. The acyl radical O=C. and the quinone-like aromatic radical system may then recombine to form a carbon-carbon single bond, thereby producing a repeating unit represented by chemical formula (4) below. As a result of this process, at least one the repeating unit represented by chemical formula (3) may be converted to chemical formula (4) below. Alternatively, the above process may proceed by a concerted mechanism, in which the old bonds break and the new bonds form simultaneously. The mechanisms of the Fries reaction are well within the knowledge of one of ordinary skill in the art. This will be described in greater detail later in a method of manufacturing an LCD.

Chemical Formula (4)

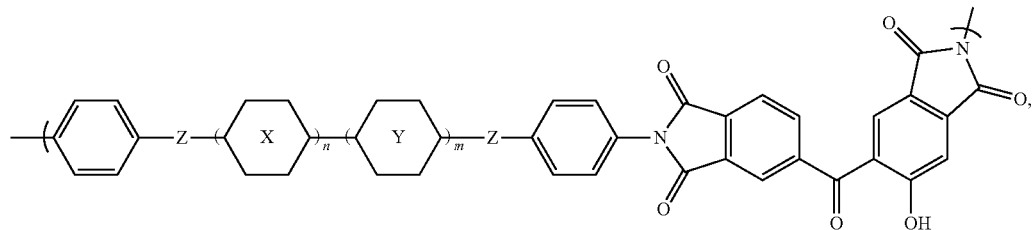

wherein Z, X, Y, n and m are identical to those in chemical formula (1).

The LCD includes alignment layers using the above alignment layer composition.

The LCD includes the first substrate 100 and the second substrate 200 which face each other, the first alignment layer 410 and the second alignment layer 420 which are disposed on the facing surfaces of the first substrate 100 and the second substrate 200, and the liquid crystal layer 300 which is interposed between the first substrate 100 and the second substrate 200. In addition, at least one of the first alignment layer 410 and the second alignment layer 420 is a copolymer of a dianhydride compound and a diamine compound, which includes a repeating unit of chemical formula (1) and a repeating unit of chemical formula (2) below:

Chemical Formula (1)

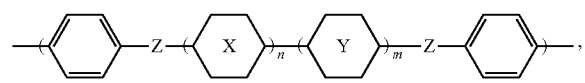

wherein

Z is an alkylene group having 2 to 8 carbon atoms,

X is an aromatic group having 6 to 30 carbon atoms or an alicyclic group having 4 to 20 carbon atoms, Y is an alicyclic group having 4 to 20 carbon atoms or an aromatic group having 6 to 30 carbon atoms, n is 0 or 1, and m is 1 or 0; and Chemical Formula (2)

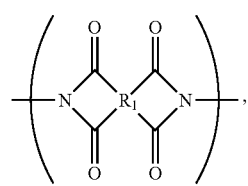

wherein $R_1$ is a tetravalent organic group derived from an alicyclic dianhydride or an aromatic dianhydride, and wherein $R_1$ includes a phenyl ester group.

In an exemplary embodiment, the chemical formula (2) may be represented by chemical formula (2-1):

Chemical Formula 2-1

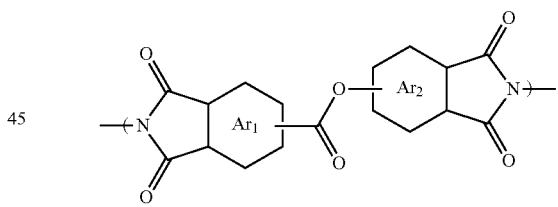

wherein $Ar_1$ and $Ar_2$ are each independently an aromatic group comprising 6 to 30 carbon atoms.

In an exemplary embodiment, the copolymer may be represented by a repeating unit of chemical formula (1-1):

Chemical Formula (1-1)

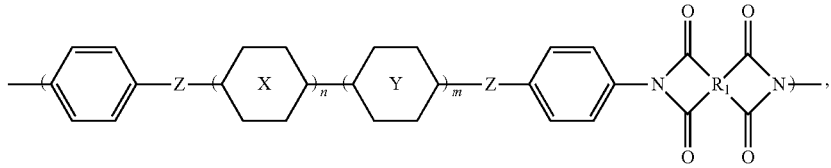

wherein Z, X, Y, $R_1$, n and m are identical to those in chemical formula (1).

In another exemplary embodiment, the copolymer may be represented by a repeating unit of chemical formula (3-1):

Chemical Formula (3-1)

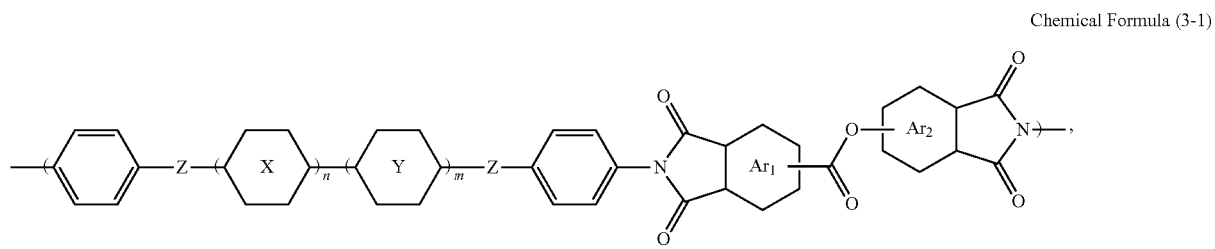

wherein
Z, X, Y, n and m are identical to those in chemical formula (1), and $Ar_1$ and $Ar_2$ are each independently an aromatic group comprising 6 to 30 carbon atoms.

The ratio of the repeating unit represented by chemical formula (1) and the repeating unit represented by chemical formula (2) may be about one to one, and the copolymer may be represented by chemical formula (3) below:

Chemical Formula (3)

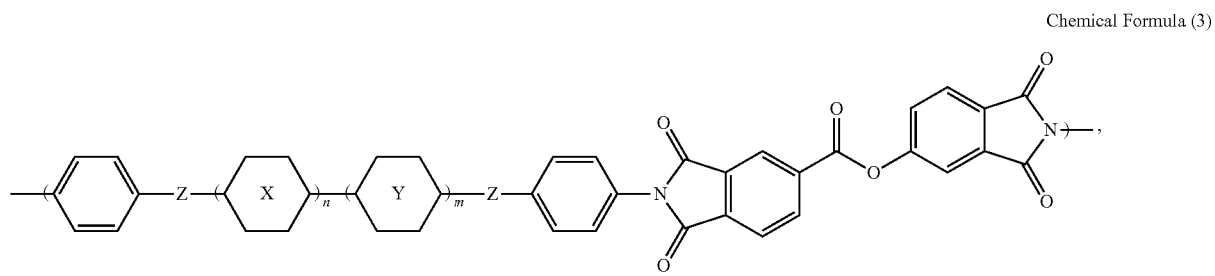

wherein Z, X, Y, n and m are identical to those in chemical formula (1) above.

In an exemplary embodiment, the copolymer may further include a repeating unit of chemical formula (4-1):

Chemical Formula (4-1)

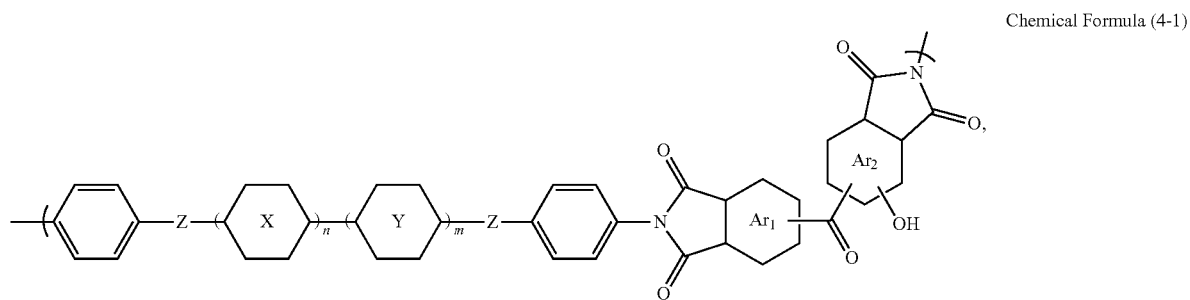

wherein Z, X, Y, $R_1$, $Ar_1$, $Ar_2$, n and m are identical to those in chemical formula (3-1).

In an exemplary embodiment, the amount of the copolymer including a repeating unit of chemical formula (4-1) may be from about 5 mole percent to about 30 mole percent based on the total amount of the repeating unit of chemical formula (3-1) and the repeating unit of chemical formula (4-1).

In an example, the copolymer may further include a repeating unit represented by chemical formula (4) below:

Chemical Formula (4)

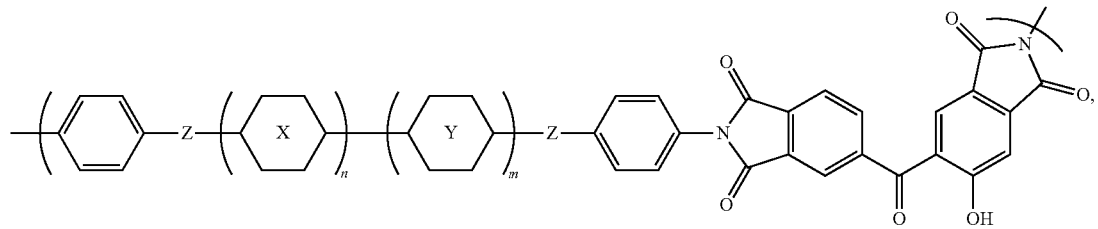

wherein Z, X, Y, n and m are identical to those in chemical formula (1).

That is, the first alignment layer 410 and/or the second alignment layer 420 may include both the repeating unit of chemical formula (3) and the repeating unit of chemical formula (4).

For example, in the copolymer included in the first alignment layer 410 and/or the second alignment layer 420, at least one of the repeating unit of chemical formula (3) may be changed to the repeating unit of chemical formula (4) by the irradiating the first alignment layer 410 and/or the second alignment layer 420 with polarized light in the process of manufacturing an LCD, which will be described later. In a non-restrictive example, the amount of the at least one of the repeating unit of chemical formula (3), which is changed to the repeating unit of chemical formula (4) may be smaller than the repeating unit of chemical formula (3). For example, approximately 5 to 30 mole percent (mole %) of the repeating unit of chemical formula (3) may be converted to the repeating unit of chemical formula (4). This indicates that, in the copolymer of the alignment layer, the repeating unit of chemical formula (3) is converted to the repeating unit of chemical formula (4) by a photoreactive group composed of a phenyl ester group included in the repeating unit of chemical formula (2). That is, the amount of the repeating unit of chemical formula (3) is reduced by a portion that is converted to chemical formula (4).

In this way, the repeating unit of chemical formula (3) and the repeating unit of chemical formula (4) may be both included in the first alignment layer 410 and/or the second alignment layer 420.

FIGS. 4 through 12 schematically illustrate a method of manufacturing an LCD. The method of manufacturing an LCD will now be described with reference to FIGS. 4 through 12.

Figure 4:
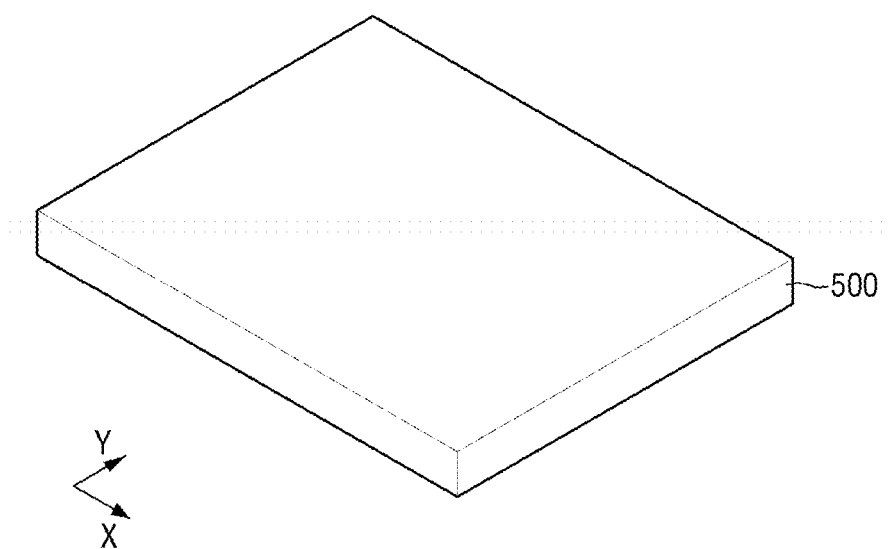
FIGS. 4 through 12 are schematic illustrations of a process of manufacturing an LCD according to an embodiment.

Referring to FIG. 4, the method of manufacturing an LCD includes preparing a substrate 500. The substrate 500 may correspond to the first substrate 100 or the second substrate 200 described above. In an exemplary embodiment, the substrate 500 may be a thin-film transistor (TFT) substrate including a first base substrate, a gate wiring layer, a semiconductor layer, a data wiring layer, a common electrode, pixel electrodes and a plurality of passivation/insulation layers or a counter substrate including a second base substrate, a light-blocking member, color filters and an overcoat layer. The positions, shapes and schematic manufacturing methods of the first substrate 100, the second substrate 200 and components of the first and second substrates 100 and 200 have already been described above with reference to FIGS. 1 through 3, and thus a detailed description thereof is omitted here.

Figure 5:
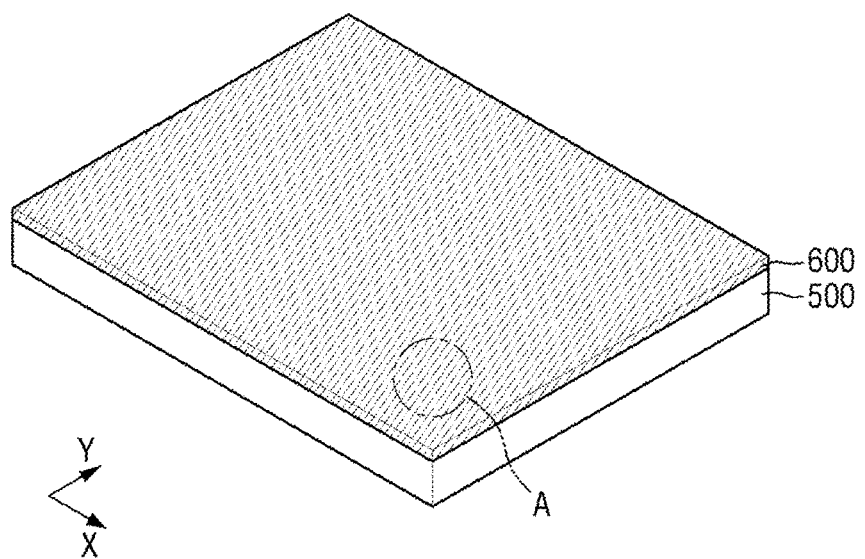
Figure 6:
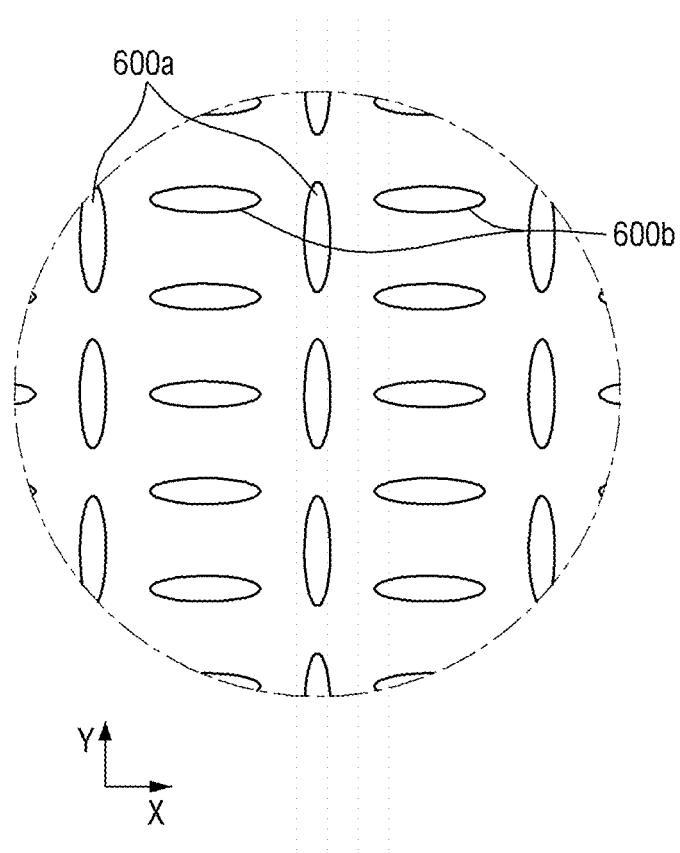

Referring to FIGS. 5 and 6, the method of manufacturing an LCD includes forming a pre-alignment layer 600 by disposing an alignment layer composition onto the substrate 500. The forming of the pre-alignment layer 600 by disposing the alignment layer composition onto the substrate 500 may be accomplished by coating the alignment layer composition on the substrate 500 using spin coating, slit coating, etc., but is not limited thereto.

The alignment layer composition is a copolymer of a dianhydride compound and a diamine compound. The alignment layer composition may include a solvent in addition to a repeating unit represented by chemical formula (1) and a repeating unit of chemical formula (2):

Chemical Formula (1)

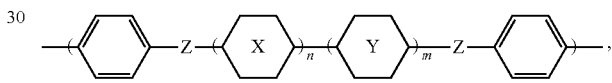

wherein

Z is an alkylene group having 2 to 8 carbon atoms,

X is an aromatic group having 6 to 30 carbon atoms or an alicyclic group having 4 to 20 carbon atoms, Y is an alicyclic group having 4 to 20 carbon atoms or an aromatic group having 6 to 30 carbon atoms, n is 0 or 1, and m is 1 or 0; and Chemical Formula (2)

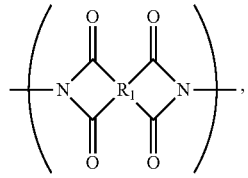

wherein $R_1$ is a tetravalent organic group derived from an alicyclic dianhydride or an aromatic dianhydride, and wherein $R_1$ includes a phenyl ester group.

In an exemplary embodiment, the chemical formula (2) may be represented by chemical formula (2-1):

Chemical Formula 2-1

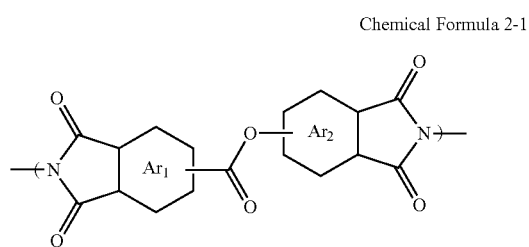

wherein $Ar_1$ and $Ar_2$ are each independently an aromatic group comprising 6 to 30 carbon atoms.

In an exemplary embodiment, the copolymer may be represented by a repeating unit of chemical formula (1-1):

Chemical Formula (1-1)

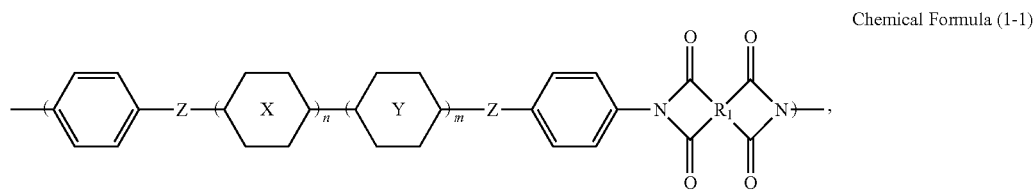

wherein Z, X, Y, $R_1$, n and m are identical to those in chemical formula (1).

In another exemplary embodiment, the copolymer may be represented by a repeating unit of chemical formula (3-1):

Chemical Formula (3-1)

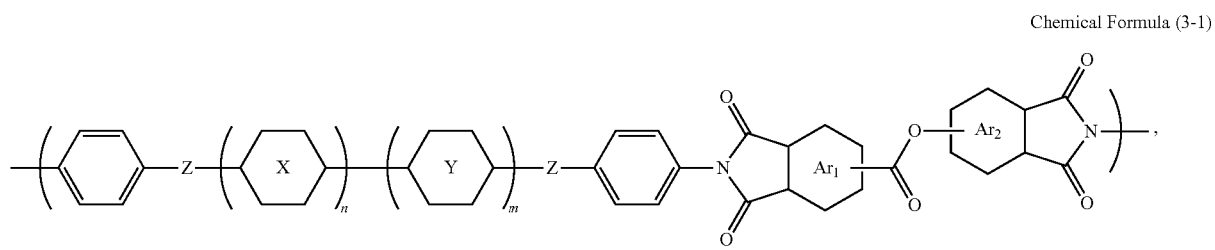

wherein
Z, X, Y, n and m are identical to those in chemical formula (1), and $Ar_1$ and $Ar_2$ are each independently an aromatic group comprising 6 to 30 carbon atoms.

In addition, the copolymer may be represented by chemical formula (3) below:

Chemical Formula (3)

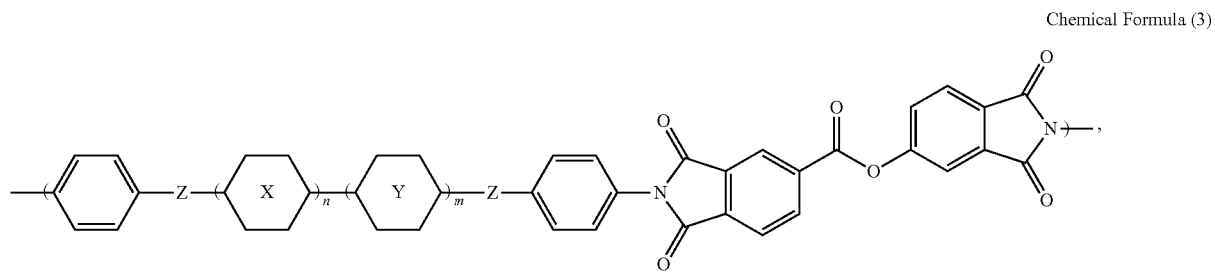

wherein Z, X, Y, n and m are identical to those in chemical formula (1) above.

In the process of manufacturing an LCD, the term 'pre-alignment layer' may refer to a layer including an alignment layer composition before the layer acquires alignment properties.

Referring to FIG. 6, in the pre-alignment layer 600 coated on the substrate 500, the copolymer may include first polymer chains 600b having directionality toward an arbitrary first direction x and second polymer chains 600a having directionality toward a second direction y perpendicular to the first direction x. Further, the first polymer chains 600b having a specified length and the second polymer chains 600a having a specified length may be repeatedly arranged in the first direction x and the second direction y and may be substantially treated as continua, respectively.

Figure 7:
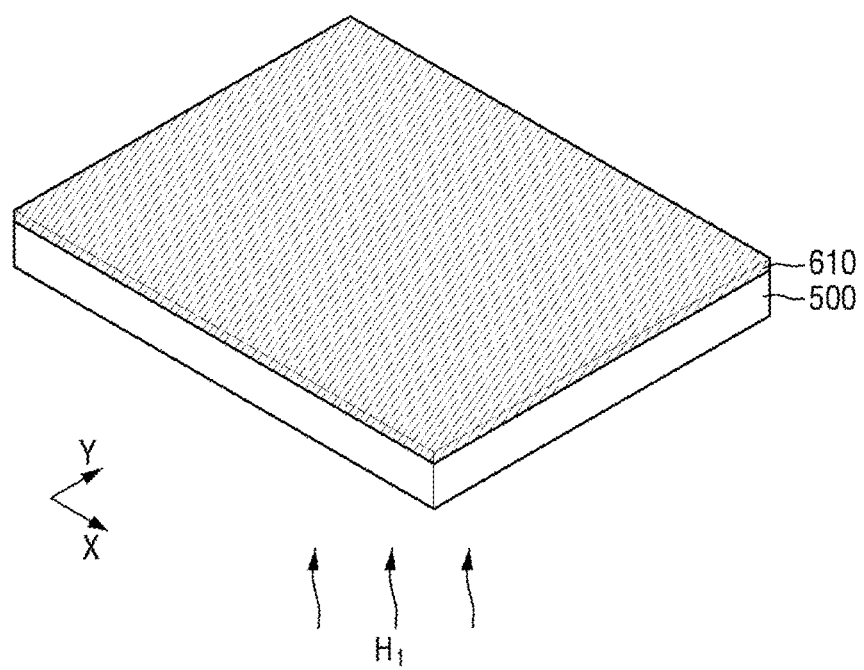

In a non-restrictive example, referring to FIG. 7, another embodiment of a method of manufacturing an LCD may include pre-treating H1 the pre-alignment layer 610 in a temperature range of 60 to 80° C. for 50 to 100 seconds before light irradiation which will be described later. The pre-treating H1 of the pre-alignment layer 610 may be a process of removing the solvent contained in the alignment layer composition. The pre-treating H1 of the pre-alignment layer 610 can reduce the fluidity of the pre-alignment layer 610 and the dispersibility of the alignment layer composition in the pre-alignment layer 610. The pre-treating H1 of the pre-alignment layer 610 is designed to volatilize a solvent contained in some alignment layer composition, but this process can be omitted, when desired.

Figure 8:
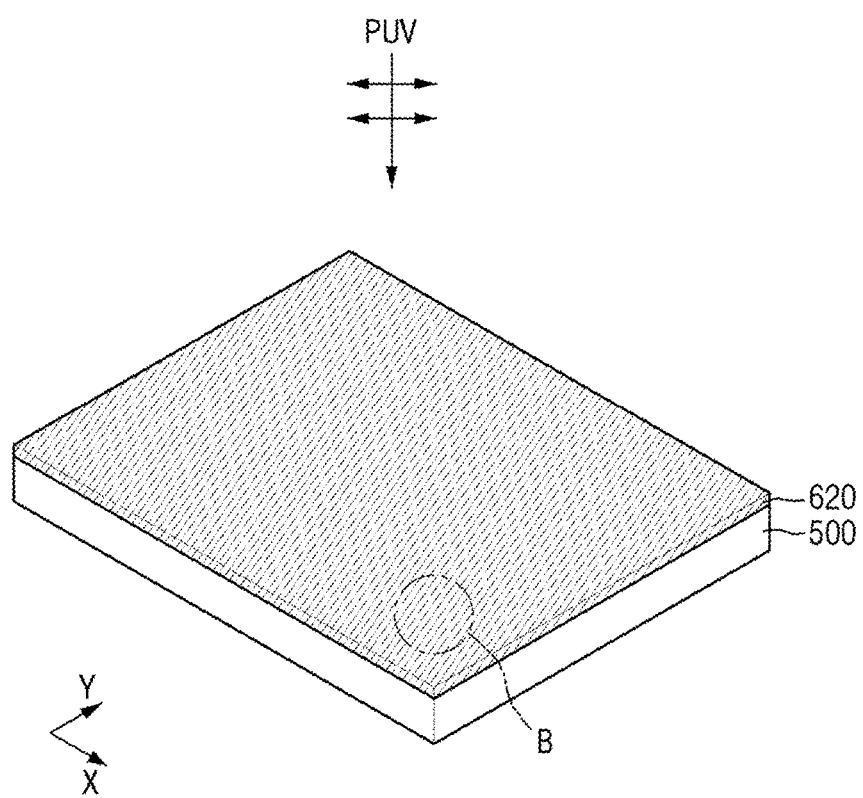
Figure 9:
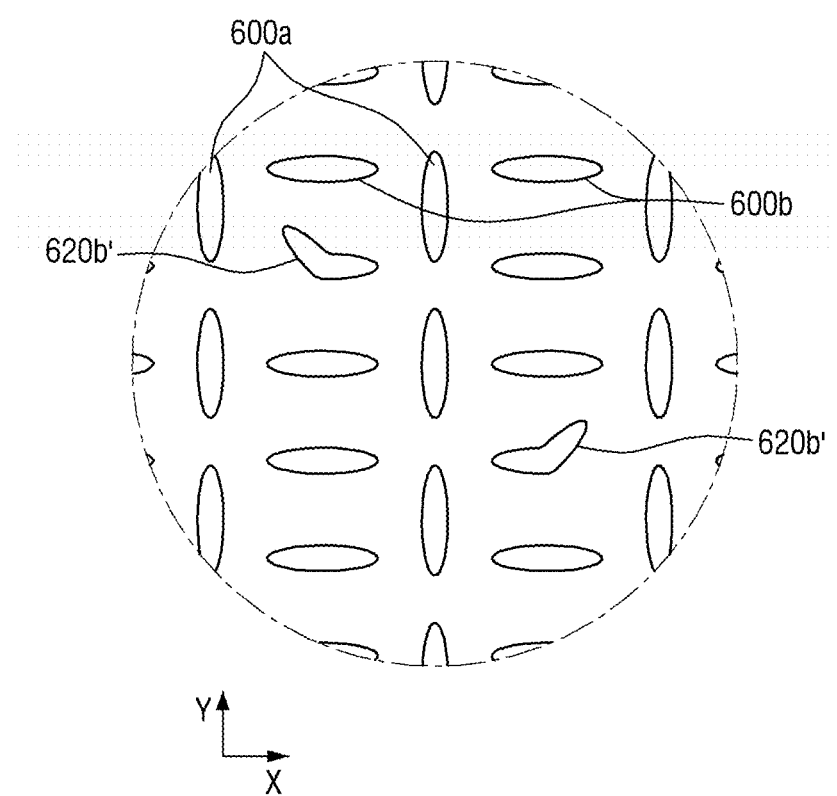

Referring to FIGS. 8 and 9, the method of manufacturing an LCD includes irradiating linearly polarized light PUV to the pre-alignment layer 620. In FIG. 8, the light linearly polarized in the first direction x is irradiated. However, the polarization direction is not limited to the first direction x and can be changed as desired.

The irradiating of the linearly polarized light PUV to the pre-alignment layer 620 may be designed to give anisotropy to the pre-alignment layer 620. The light PUV may be at least one of ultraviolet light, infrared light, far infrared light, electron rays, and radioactive rays. For example, the light PUV may be ultraviolet light having a wavelength of approximately 250 to 330 nanometers (nm), ultraviolet light having a wavelength of approximately 254 nm, or ultraviolet light having a wavelength of approximately 313 nm.

When the light PUV linearly polarized in the first direction x is irradiated, at least some of the first polymer chains 620*b*, which have directionality toward the first direction x, in the pre-alignment layer 620 may absorb the linearly polarized light PUV, and a C—O bond in an O═C—O bond of the phenyl ester group of the copolymer may be homolytically cleaved by absorption of polarized light to form an acyl radical O═C. and a quinone-like aromatic radical system. The acyl radical O═C. and the quinone-like aromatic radical system may then recombine to form a carbon-carbon double bond, thereby producing a repeating unit represented by chemical formula (4) below. As a result, the main chains of the at least some of the first polymer chains 620*b* may be bent (tilted).

In an exemplary embodiment, the copolymer may further include a repeating unit of chemical formula (4-1):

wherein Z, X, Y, n and m are identical to those in chemical formula (1).

That is, referring to FIG. 9, some of the first polymer chains 620*b* having directionality toward the first direction x may be converted to modified polymer chains 620*b*' bent in a certain direction. In other words, the unchanged main chains of the first polymer chains 620*b* or the second polymer chains 620*a* may include the repeating unit of chemical formula (3), and the changed main chains 620*b*' of the first polymer chains 620*b* may include the repeating unit of chemical formula (4).

In an embodiment, polymer chains in the pre-alignment layer 620 may absorb the linearly polarized light PUV and be arranged as follows. At least some of the first polymer chains 620*b* having linearity or directionality roughly toward the first direction x may undergo a photo-Fries reaction. The photo-Fries reaction may result in main chains of the at least some of the first polymer chains 620*b* to be bent in a direction (that is, partially oriented toward the second direction y from the first direction x) different from the first direction x. Accordingly, the at least some of the first polymer chains 620*b* may be rearranged and stabilized to be changed to the modified polymer chains 620*b*'. As a result, the continuity of the first polymer chains 620*b* in the first direction x is reduced. On the other hand, the second Chemical Formula (4-1)

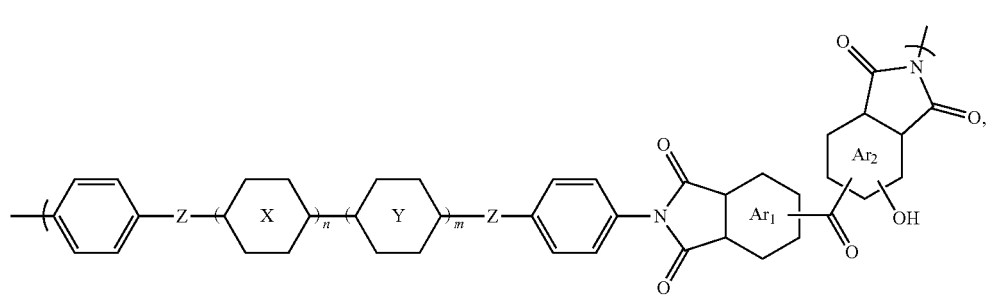

wherein Z, X, Y, $R_1$, $Ar_2$, n and m are identical to those in chemical formula (3-1).

In an exemplary embodiment, the amount of the copolymer including a repeating unit of chemical formula (4-1) may be from about 5 mole percent to about 30 mole percent based on the total amount of the repeating unit of chemical formula (3-1) and the repeating unit of chemical formula (4-1).

For example, in the case of the repeating unit of formula (3), at least some of the first polymer chains 620*b* may absorb the linearly polarized light PUV and may be rearranged as in chemical formula (4) by a photo-Fries reaction to produce tilted main chains:

polymer chains 620*a* having linearity in the second direction y does not undergo a photoreaction. Thus, the second polymer chains 620*a* can give anisotropy to the whole of the pre-alignment layer 620.

In the irradiating of the linearly polarized light PUV to the pre-alignment layer 620, the linearly polarized light PUV may be irradiated at an exposure dose of approximately 0.1 to 3.0 Joules per square centimeter (J/cm²). The exposure dose may be controlled by the duration of light irradiation to the pre-alignment layer 620 or the output of light. However, the exposure dose may vary according to the driving mode of an LCD or physical properties of a main material that forms the photo-alignment layer.

Chemical Formula (4)

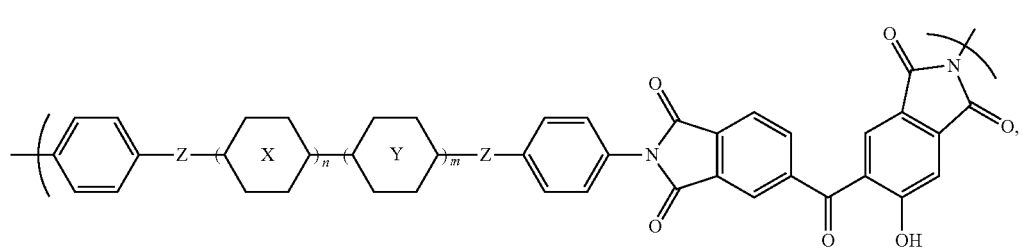

The alignment layer composition does not require a cleaning process because it does not generate byproducts as a result of a photoreaction such as a photolytic reaction. The omission of the cleaning process can prevent the damage or adhesion of a foreign matter to an alignment layer having anisotropy which can occur during the cleaning process and improve process efficiency. In some embodiments, however, the cleaning process may be performed. In those embodiments, the cleaning process may be a dry cleaning process or a wet cleaning process.

Figure 10:
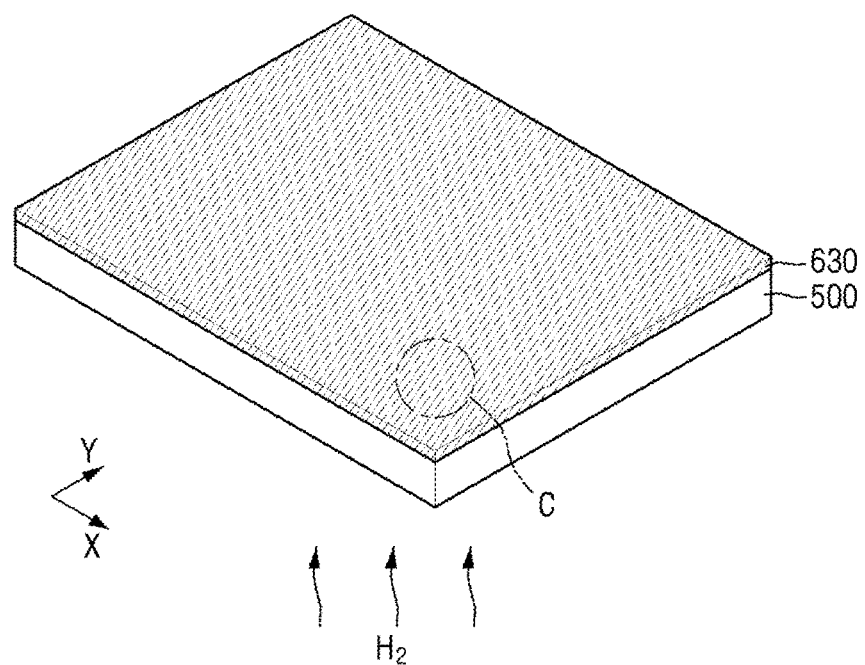
Figure 11:
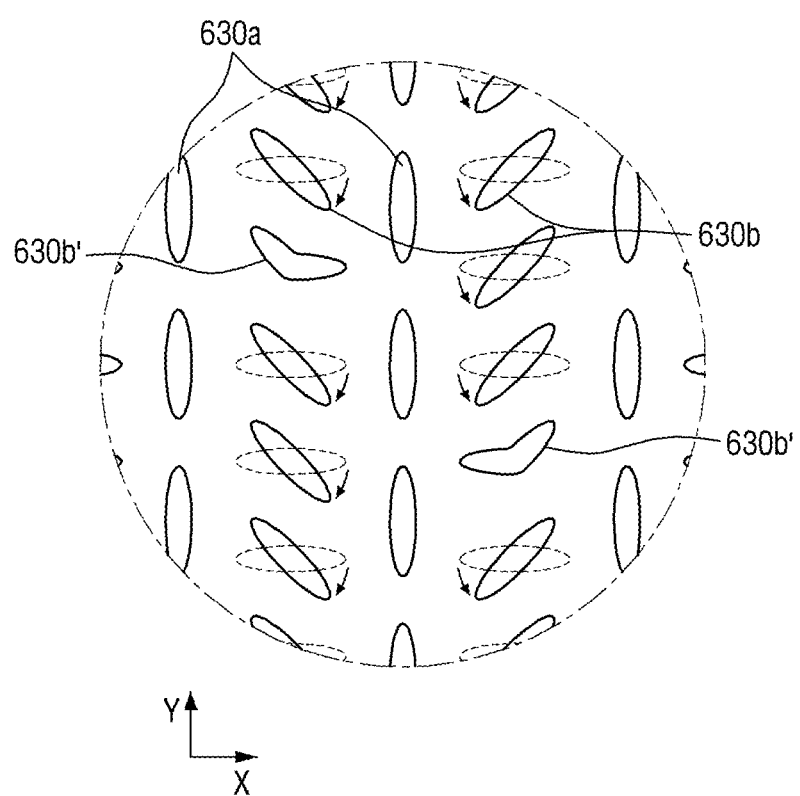

Referring to FIGS. 10 and 11, the method of manufacturing an LCD includes heat-treating H2 the pre-alignment layer 630. The heat-treating H2 of the pre-alignment layer 630 may be designed to further improve alignment capability by stabilizing unstable reactive groups and rearranging the first and/or second polymer chains 630b and/or 630a after the irradiating of the linearly polarized light PUV. In addition, the heat-treating H2 of the pre-alignment layer 630 may be designed to increase heat resistance of the pre-alignment layer 630 by finally removing the remaining solvent.

As described above with reference to FIG. 9, the pre-alignment layer 630 includes the modified polymer chains 630b' partially oriented toward the second direction y perpendicular to the linearly polarized light PUV through the absorption of the linearly polarized light PUV. In addition, polymers within the alignment layer composition come to have fluidity through the heat-treating H2 of the pre-alignment layer 630. Therefore, referring to FIG. 11, as the modified first polymer chains 630b' located in the second direction y, the first polymer chains 630b having directionality toward the first direction x can move easily due to the fluidity obtained by the heat-treating H2 of the pre-alignment layer 630. In addition, the first polymer chains 630b can be moved toward the second direction y by the second polymer chains 620a arranged adjacent to the first polymer chains 630b.

That is, the polymer chains 630b are gradually aligned toward the second direction y by portions of the modified polymer chains 630b' which are oriented toward the second direction y and the second polymer chains 620a which are arranged in the second direction y. As a result of the above process, referring to FIG. 12, the pre-alignment layer 630 may be manufactured into an alignment layer 640 having alignment properties toward the second direction y.

In other words, the irradiating of the linearly polarized light PUV to the pre-alignment layer 630 causes partial discontinuity of the first polymer chains 630b in the first direction x. The partial discontinuity of the first polymer chains 630b weakens the interaction force between adjacent first polymer chains 630b, which, in turn, makes it easy to rearrange the first polymer chains 630b. On the other hand, the second polymer chains 630a can resist rearrangement due to a strong interface force between the second polymer chains 630a.

That is, while the first polymer chains 630b, some of which have undergone a photoreaction, are rearranged by heat treatment, the second polymer chains 630a maintain directionality toward the second direction y without being rearranged. Therefore, the overall directionalities of the first polymer chains 630b and the second polymer chains 630a may converge on the second direction y. This can further give anisotropy to the pre-alignment layer 630.

The heat-treating H2 of the pre-alignment layer 630 may be performed at a temperature of 210 to 240° C. for 20 to 45 minutes, but the present embodiments are not limited thereto.

Figure 12:
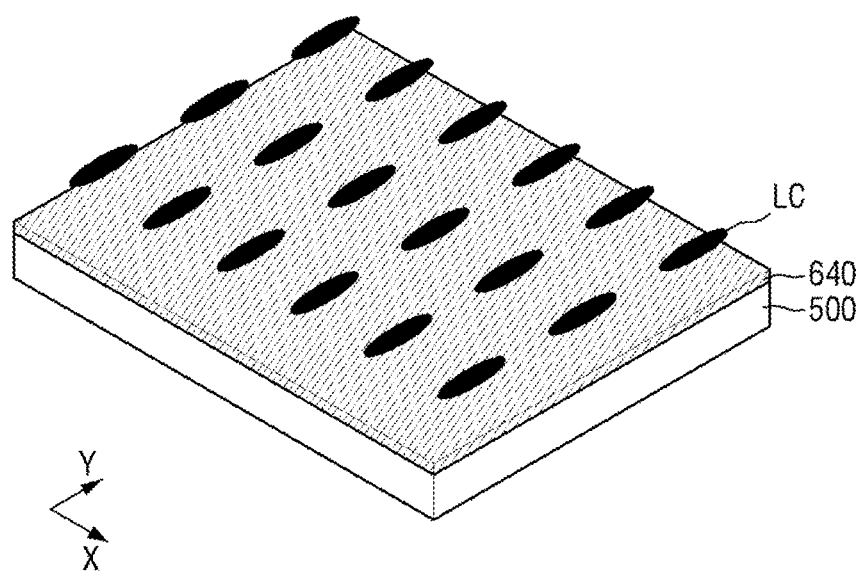

Referring to FIG. 12, a liquid crystal layer including liquid crystal molecules LC is formed on the substrate 500, and the substrate 500 and another substrate which faces the substrate 500 may be bonded together. Long axes of the liquid crystal molecules LC may be aligned roughly toward the second direction y by anisotropy formed by polymer chains within the alignment layer 640. In an exemplary embodiment, the forming of the liquid crystal layer may be a process of placing (for example, dropping) a liquid crystal composition onto the substrate 500 and/or a counter substrate (not illustrated) and then bonding the substrate 500 and the counter substrate (not illustrated) together. However, the forming of the liquid crystal layer may also be a process of injecting the liquid crystal composition after bonding the substrate 500 and the counter substrate (not illustrated) together.

Hereinafter, the present inventive concept will be described in greater detail with reference to experimental data.

Embodiment 1

An LCD was manufactured by forming an alignment layer using an alignment layer composition which includes a copolymer of a repeating unit of chemical formula (5) below and a repeating unit having a photoreactive group composed of a phenyl ester group:

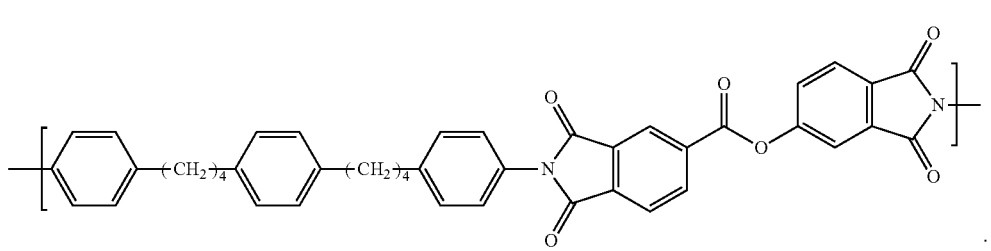

Chemical Formula (5)

Embodiment 2

An LCD was manufactured by forming an alignment layer using an alignment layer composition which includes a copolymer of a repeating unit of chemical formula (6) below and a repeating unit having a photoreactive group composed of a phenyl ester group:

Chemical Formula (6)

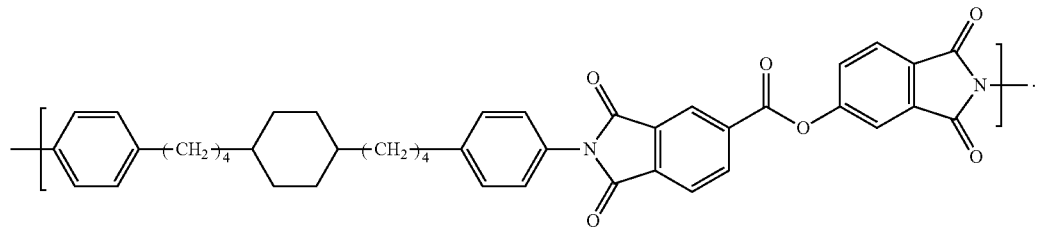

Control Group

An LCD was manufactured by forming an alignment layer using a decomposing alignment layer composition which includes a repeating unit of chemical formula (8) originated from a diamine compound of chemical formula (7) below:

Chemical Formula (7)

Chemical Formula (8)

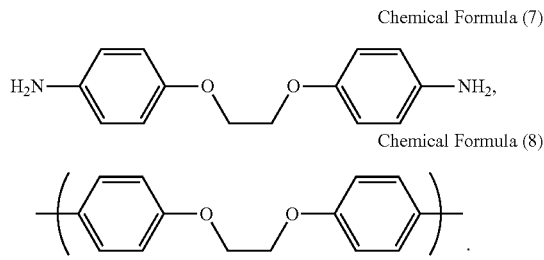

COMPARATIVE EXAMPLE 1

An LCD was manufactured by forming an alignment layer using an alignment layer composition which includes a copolymer of a repeating unit of chemical formula (9) below and a repeating unit having a photoreactive group composed of a phenyl ester group:

Chemical Formula (9)

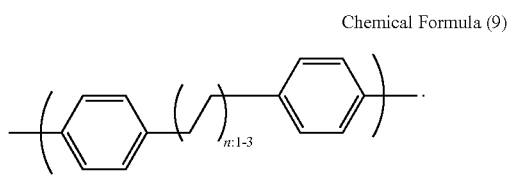

EXPERIMENTAL EXAMPLE 1

AC Afterimage Quantification

Figure 13:
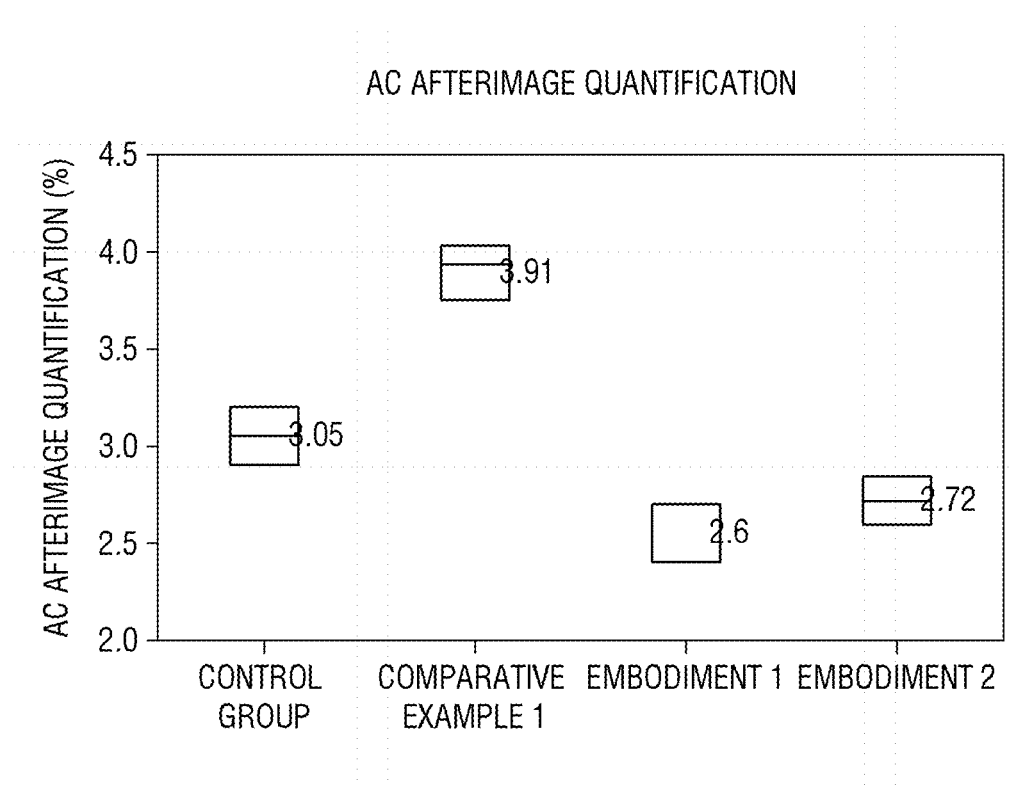
FIG. 13 is a illustrating alternating current (AC) afterimage quantification results (percent, %) of Experimental Example 1.

The AC afterimage quantification evaluation of the LCDs manufactured in Embodiments 1 and 2, Control Group and Comparative Example 1 was performed, and the evaluation results were plotted on a graph shown in FIG. 13. The AC afterimage quantification evaluation was performed by measuring, using Minolta CA-210, a difference between 8 Grey initial luminance of a 2.5-inch test cell and luminance obtained after the application of 4.5 volts (V) AC for one hour.

Referring to the graph illustrated in FIG. 13, Embodiments 1 and 2 show a reduced AC afterimage effect compared with Control Group using the photolytic alignment layer and a far reduced AC afterimage effect compared Comparative Example 1.

EXPERIMENTAL EXAMPLE 2

Black Luminance

Figure 14:
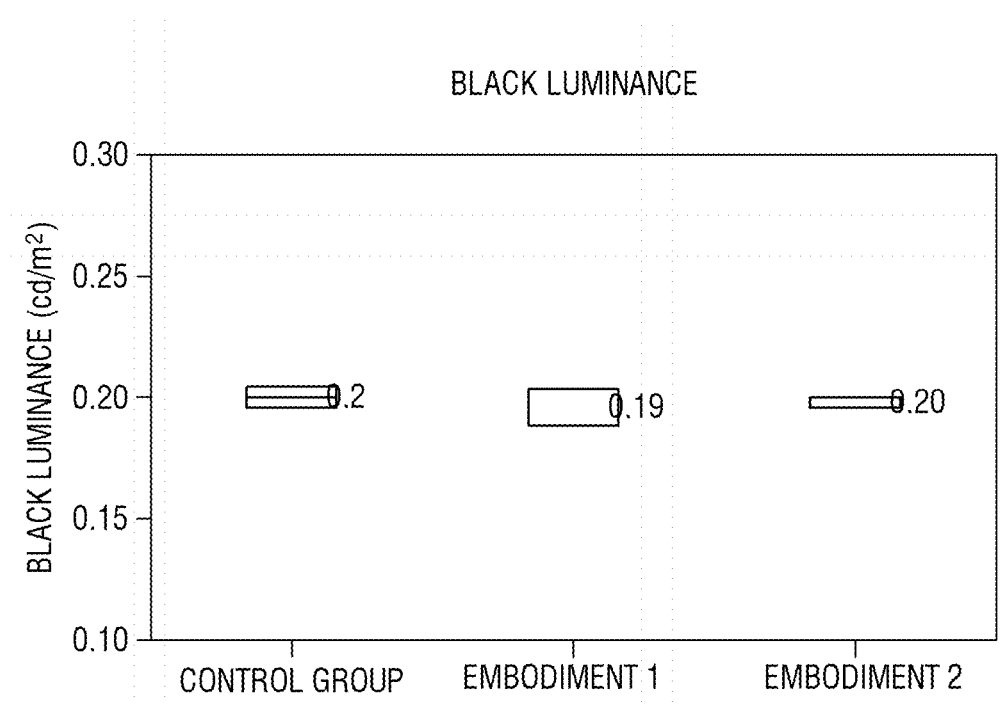
FIG. 14 is a illustrating black luminance results (candelas per square meter, $cd/m^2$) of Experimental Example 2.

Black luminance levels of Embodiments 1 and 2 and Control Group were evaluated, and the evaluation results were plotted on a graph shown in FIG. 14. The evaluation of the black luminance levels was performed by measuring luminance of a 2.5-inch PLS test cell in an initial, undriven state using CA-210 and ELABO-230CF.

Referring to the graph illustrated in FIG. 14, Embodiments 1 and 2 of the present disclosure show black luminance levels equivalent to that of Control Group using the photolytic alignment layer. Therefore, it can be understood that an alignment layer including a photoreactive group has alignment properties equivalent to those of a photolytic alignment layer.

EXPERIMENTAL EXAMPLE 3

Contrast Ratio (CR)

Figure 15:
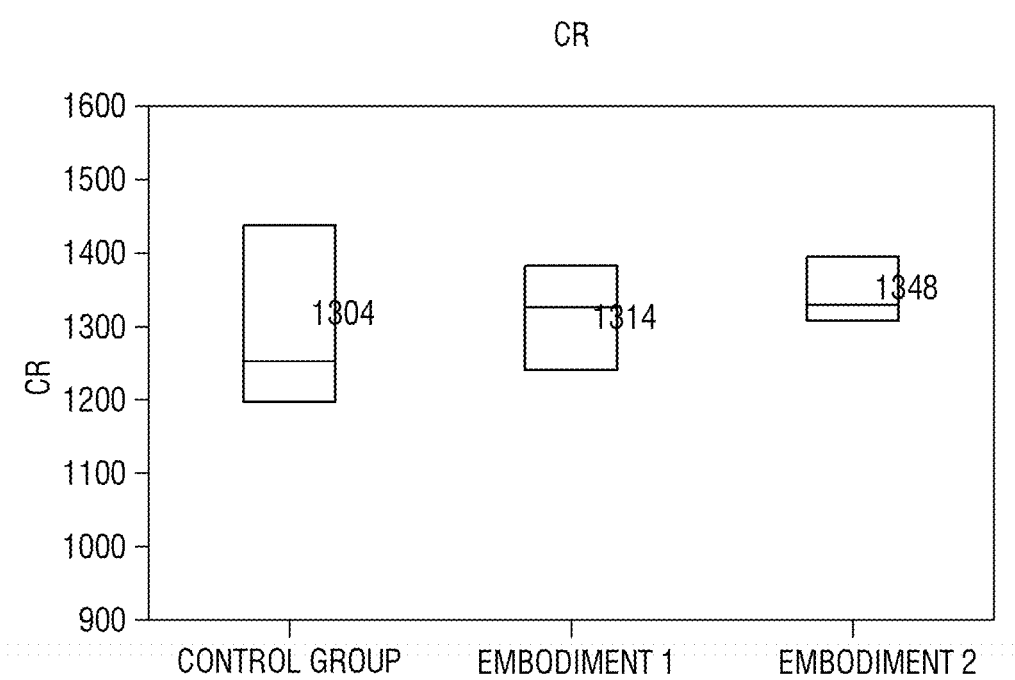
FIG. 15 is a diagram illustrating contrast ratio results of Experimental Example 3.

Contrast ratios of Embodiments 1 and 2 and Control Group were measured, and the measurement results were plotted on a graph shown in FIG. 15. The contrast ratios were measured by measuring a difference between black luminance and white luminance of a 12.9-inch PLS test cell using CA-210.

Referring to the graph illustrated in FIG. 15, Embodiments 1 and 2 of the present disclosure show contrast ratios equivalent to or higher than that of Control Group using the photolytic alignment layer.

EXPERIMENTAL EXAMPLE 4

Alignment Capability Test

In a state where a pixel included in each of the LCDs manufactured in Embodiments 1 and 2, Control Group and Comparative Example 1 was being driven, part of the pixel was photographed. The photographing results of Embodiment 1, Embodiment 2, Control Group and Comparative 1 were illustrated sequentially in FIGS. 16 through 19.

In addition, in a black state where the pixel was not being driven, a part of the pixel was photographed. Then, the photographing results of Embodiment 1, Embodiment 2, Control Group and Comparative Example 1 were illustrated sequentially in FIGS. 20 through 23.

Figure 16:
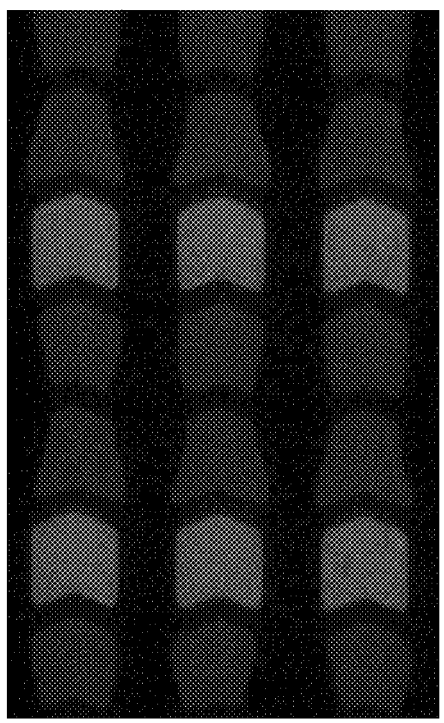
FIGS. 16 through 23 are photographs showing results of Experimental Example 4.
Figure 17:
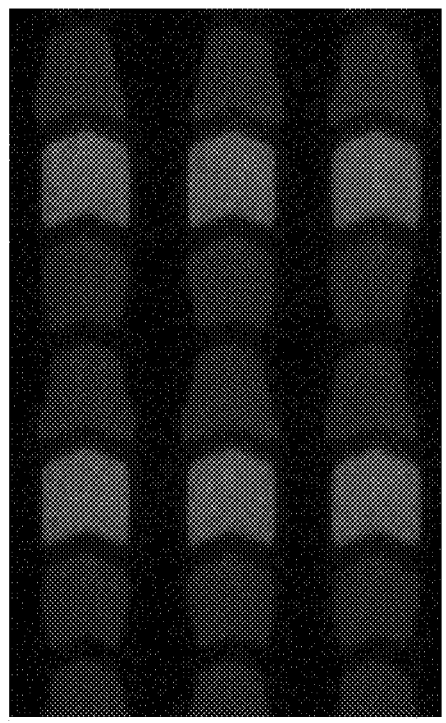
Figure 18:
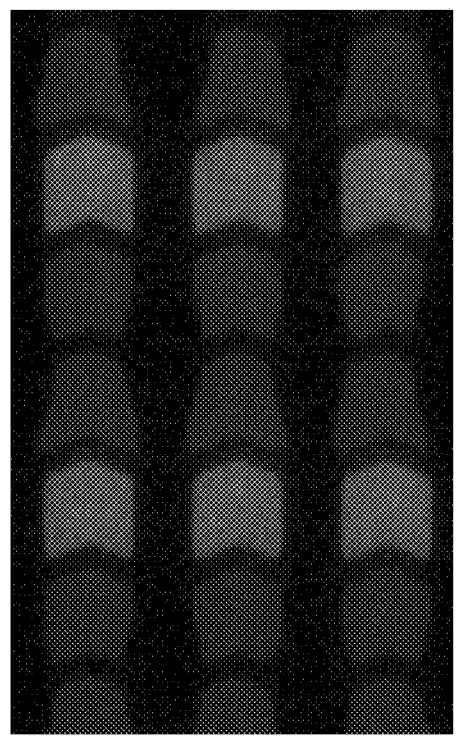
Figure 19:
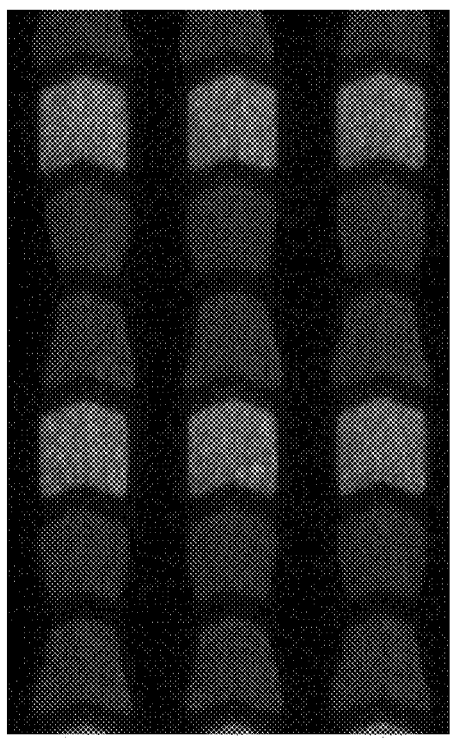

Referring to FIGS. 16 through 18, Embodiments 1 and 2 show an alignment capability equivalent to or higher than that of Control Group using the photolytic alignment layer. On the other hand, referring to FIG. 19, Comparative Example 1 shows a very low alignment capability.

Figure 20:
Figure 21:
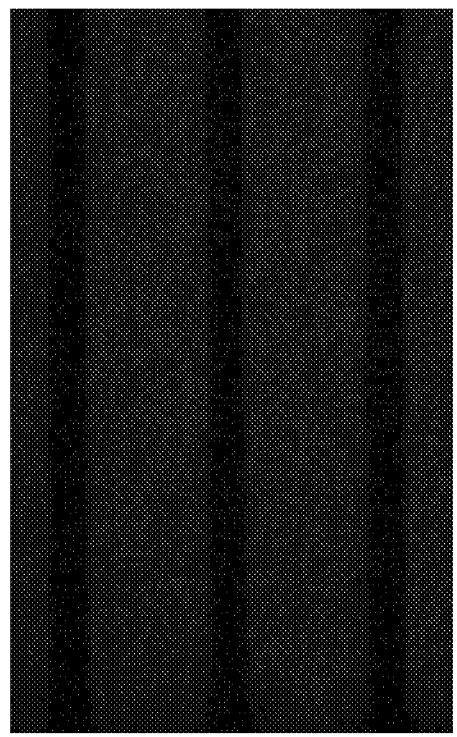
Figure 22:
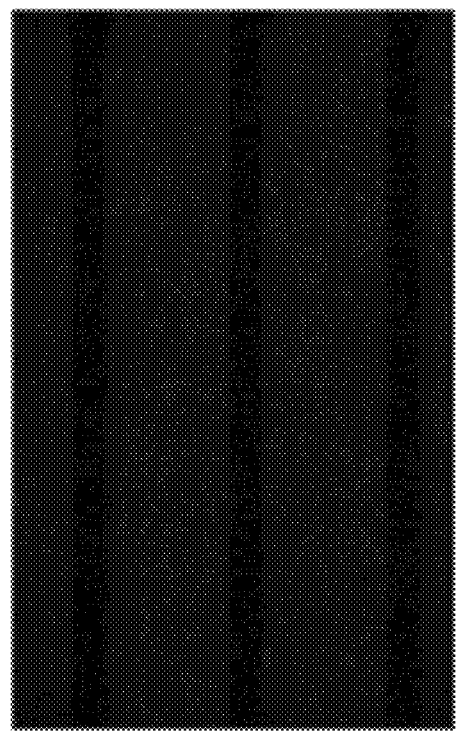
Figure 23:
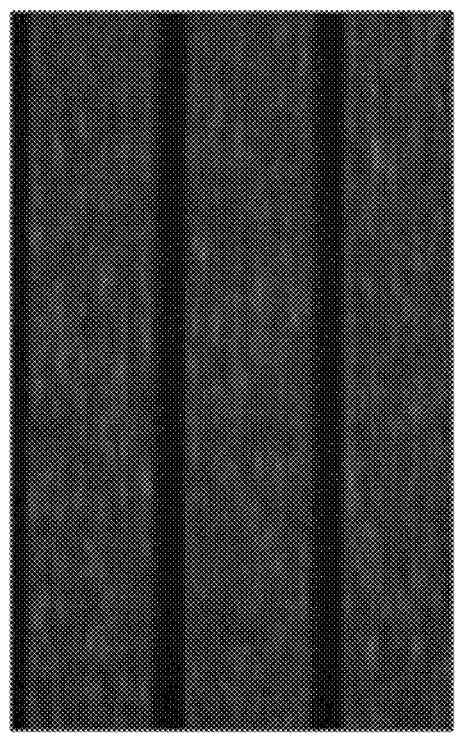

Further, referring to FIGS. 20 through 22, Embodiments 1 and 2 show black luminance characteristics equivalent to or better than those of Control Group using the photolytic alignment layer. On the other hand, referring to FIG. 23, Comparative Example 1 shows degraded black luminance characteristics due to a very low alignment capability.

EXPERIMENTAL EXAMPLE 5

Scratch Resistance Test

The scratch resistance of the LCDs manufactured in Embodiment 1, Control Group, and Comparative Example 1 was tested. The scratch resistance test included preparing a single substrate having an alignment layer printed to a thickness of 300 nm, rubbing the substrate to a rubbing depth of 13.5 nm and at a rubbing roll speed of 750 revolutions per minute (rpm), and then checking scratches formed on the alignment layer.

Figure 24:
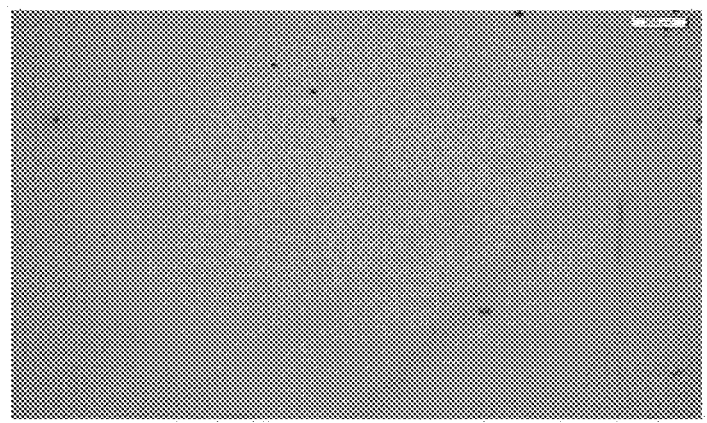
FIGS. 24 through 26 are photographs showing results of Experimental Example 5.
Figure 25:
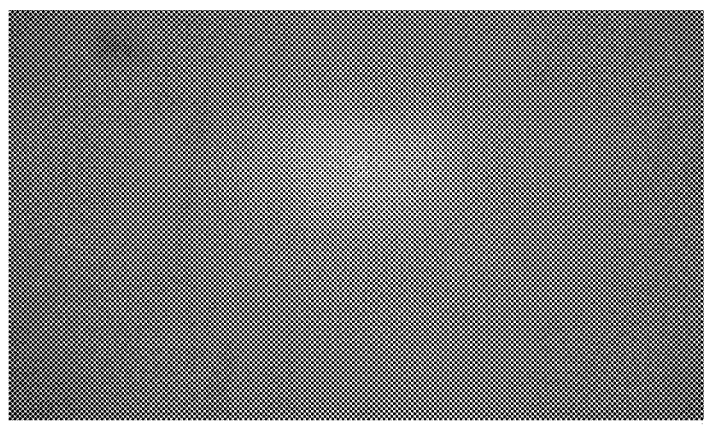
Figure 26:
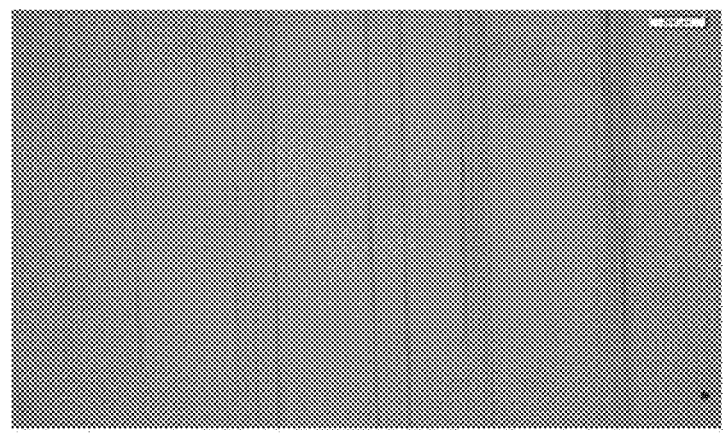

The results of testing the scratch resistance of Embodiment 1, Control Group and Comparative 1 were measured and photographed, and the photographing results were illustrated sequentially in FIGS. 24 through 26.

Referring to FIGS. 24 and 25, the alignment layers hardly have any scratches and show very high scratch resistance equivalent to that of Control Group. Therefore, it can be understood that a chain-like group and an alicyclic or aromatic group included in the repeating unit of formula (1) contributes to an improvement of the layer hardness.

On the other hand, referring to FIG. 26, the alignment layer of Comparative Example 1 has a substantial number of scratches, indicating that it has relatively low hardness.

EXPERIMENTAL EXAMPLE 6

Wear Resistance Test

The wear resistance of the LCDs manufactured in Embodiment 1, Control Group, and Comparative Example 1 was tested. The wear resistance test included performing a backpack vibration test 800 times on a 12.9-inch PLS test cell using a weight of 750 grams (g), a backpack of 3 kilograms (kg), and a stage speed of 40 rpm and then measuring layer hardness using a layer hardness tester.

Figure 27:
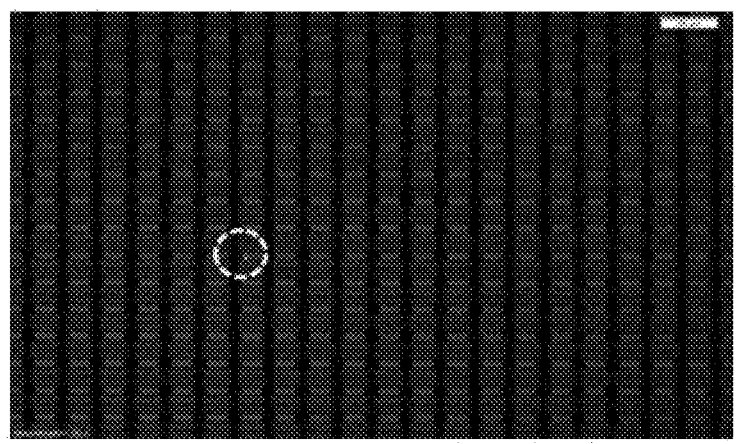
FIGS. 27 through 29 are photographs showing results of Experimental Example 6.
Figure 28:
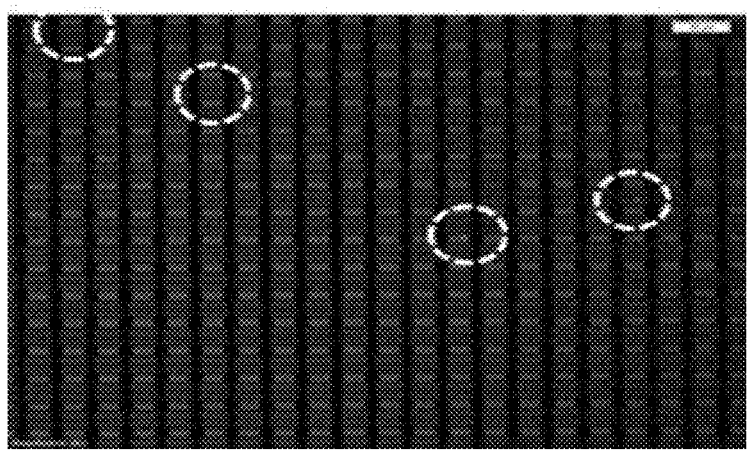
Figure 29:
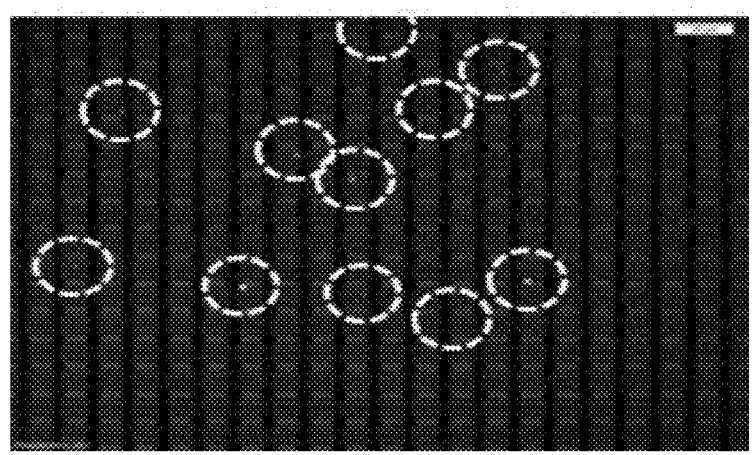

The results of testing the wear resistance of Embodiment 1, Control Group and Comparative 1 were measured and photographed, and the photographing results were illustrated sequentially in FIGS. 27 through 29. White dotted portions in FIGS. 27 through 29 indicate portions of wear.

Referring to FIGS. 27 and 28, the alignment layers have some wear, but were only slightly different in wear from the alignment layer of Control Group. However, referring to FIG. 29, Comparative Example 1 has a lot of wear. Therefore, it can be understood that the alignment layer of Embodiment 1 has wear resistance characteristics equivalent to those of the photolytic alignment layer and better than those of the alignment layer of Comparative Example 1. As in the scratch resistance test, this can be understood that a chain-like group and an alicyclic or aromatic group included in the repeating unit of formula (1) contributes to an improvement in layer hardness.

EXPERIMENTAL EXAMPLE 7

Light Leak Defect Test

A light leak defect test was performed on the LCDs manufactured in Embodiments 1 and 2 and Control Group. The light leak defect test included aging a 2.5-inch PLS test cell and a 12.9-inch PLS test cell in an oven at a temperature of 70° C. and then performing a high temperature storage (FITS) test.

Figure 30:
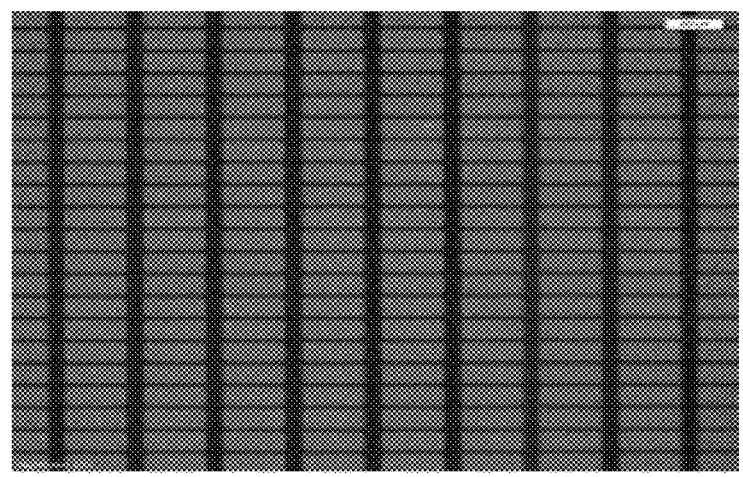
FIGS. 30 through 32 are photographs showing results of Experimental Example 7.
Figure 31:
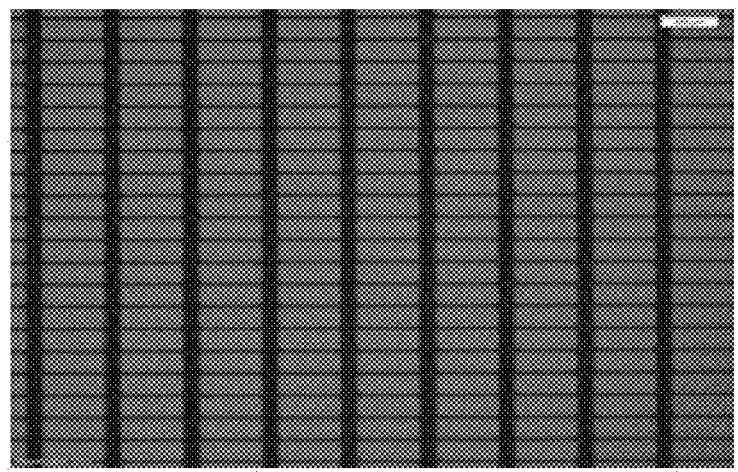
Figure 32:
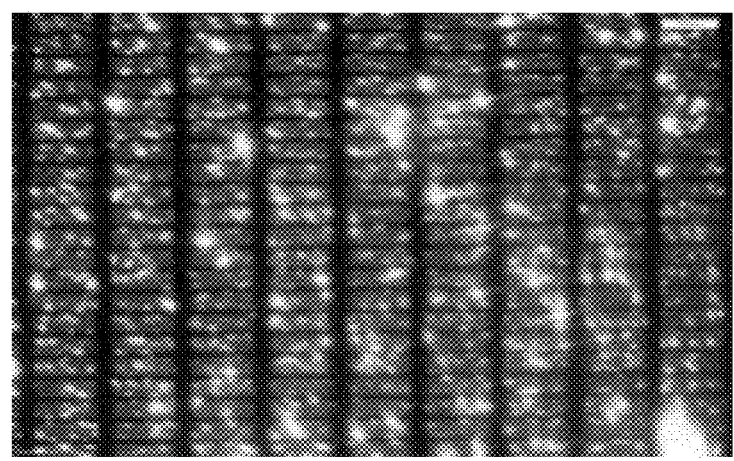

The results of the light leak defect test on Embodiment 1, Embodiment 2 and Control Group were measured and photographed, and the photographing results were illustrated sequentially in FIGS. 30 through 32. Referring to FIGS. 30 and 31, Embodiments 1 and 2 hardly have light leak defects.

However, Control Group using the photolytic alignment layer suffers from quite a substantial number of light leaks due to the byproducts produced by photolysis.

While exemplary embodiments have been shown and described above, it will be apparent to those skilled in the art that modifications and variations could be made without departing from the spirit and scope of the present inventive concept as defined by the appended claims. The exemplary embodiments should be considered in a descriptive sense only and not for purposes of limitation.

What is claimed is:
1. An alignment layer composition comprising:
   a copolymer of a dianhydride compound and a diamine compound, comprising:
   a repeating unit represented by chemical formula (1); and
   a repeating unit represented by chemical formula (2):

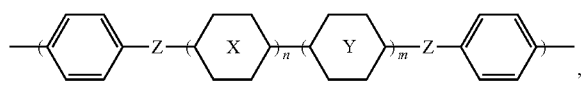

Chemical Formula (1)

wherein
Z is an alkylene group comprising 2 to 8 carbon atoms,
X is an aromatic group comprising 6 to 30 carbon atoms or an alicyclic group comprising 4 to 20 carbon atoms,
Y is an alicyclic group comprising 4 to 20 carbon atoms or an aromatic group comprising 6 to 30 carbon atoms,
provided that at least one of X and Y is an alicyclic group comprising 4 to 20 carbon atoms,
n is 0 or 1, and
m is 1 or 0, provided that at least one of n and m is 1; and

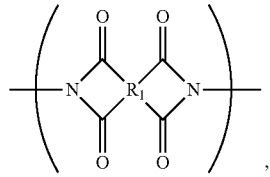

Chemical Formula (2)

wherein $R_1$ is a tetravalent organic group derived from an alicyclic dianhydride or an aromatic dianhydride, and
wherein $R_1$ comprises a phenyl ester group.

2. The alignment layer composition of claim 1, wherein in chemical formula (1),
m is 0,
n is 1, and
X is an alicyclic group comprising 4 to 20 carbon atoms.

3. The alignment layer composition of claim 1, wherein in chemical formula (1),
each of n and m is 1,
X is an alicyclic group comprising 4 to 20 carbon atoms, and
Y is an aromatic group comprising 6 to 30 carbon atoms.

4. The alignment layer composition of claim 1, wherein in chemical formula (1),
each of n and m is 1,
Y is an alicyclic group comprising 4 to 20 carbon atoms, and
X is an aromatic group comprising 6 to 30 carbon atoms.

5. The alignment layer composition of claim 1, wherein the copolymer is represented by a repeating unit of chemical formula (3):

Chemical Formula (3)

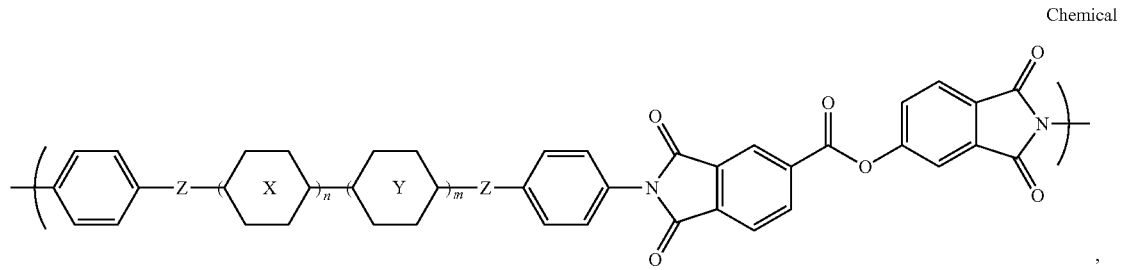

wherein Z, X, Y, n and m are identical to those in chemical formula (1).

6. The alignment layer composition of claim 1, wherein the ratio of the diamine compound and the dianhydride compound is about 1:1.

7. A liquid crystal display comprising:
a first substrate and a second substrate facing each other;
a first alignment layer disposed on a surface of the first substrate facing the second substrate;
a second alignment layer disposed on a surface of the second substrate facing the first substrate; and
a liquid crystal layer interposed between the first substrate and the second substrate,
wherein at least one of the first alignment layer and the second alignment layer comprises a copolymer of a dianhydride compound and a diamine compound, comprising:
a repeating unit represented by chemical formula (1) and a repeating unit represented by chemical formula (2):

Chemical Formula (1)

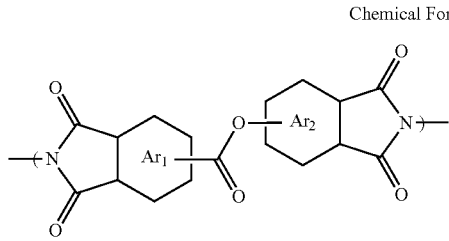

wherein
Z is an alkylene group comprising 2 to 8 carbon atoms,
X is an aromatic group comprising 6 to 30 carbon atoms or an alicyclic group comprising 4 to 20 carbon atoms,
Y is an alicyclic group comprising 4 to 20 carbon atoms or an aromatic group comprising 6 to 30 carbon atoms,
provided that at least one of X and Y is an alicyclic group comprising 4 to 20 carbon atoms,
n is 0 or 1, and
m is 1 or 0, provided that at least one of n and m is 1; and Chemical Formula (2)

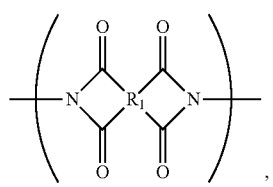

wherein $R_1$ is a tetravalent organic group derived from an alicyclic dianhydride or an aromatic dianhydride, wherein $R_1$ comprises a phenyl ester group.

8. The liquid crystal display of claim 7, wherein the chemical formula (2) is represented by chemical formula (2-1):

Chemical Formula 2-1 wherein $Ar_1$ and $Ar_2$ are each independently an aromatic group comprising 6 to 30 carbon atoms.

9. The liquid crystal display of claim 7, wherein the copolymer is represented by a repeating unit of chemical formula (1-1):

Chemical Formula (1-1)

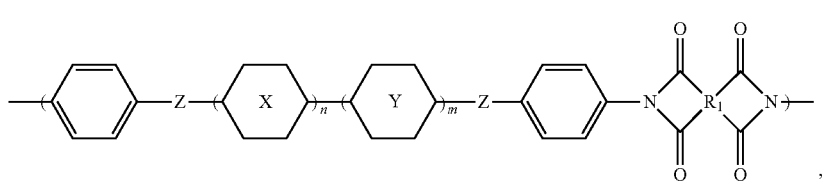

wherein Z, X, Y, R$_1$, n and m are identical to those in chemical formula (1).

10. The liquid crystal display of claim 7, wherein the copolymer is represented by a repeating unit of chemical formula (3-1):

Chemical Formula (3-1)

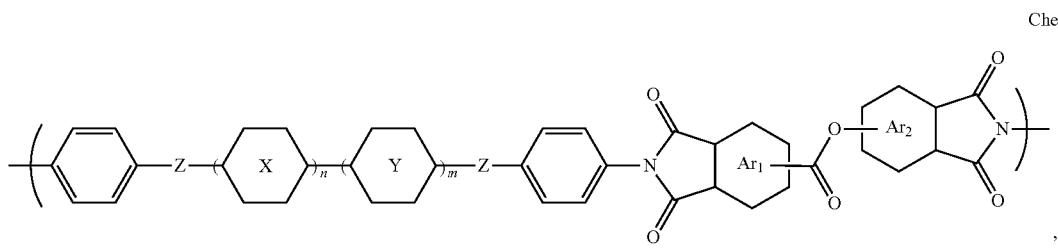

wherein
Z, X, Y, n and m are identical to those in chemical formula (1), and
Ar$_1$ and Ar$_2$ are each independently an aromatic group comprising 6 to 30 carbon atoms.

11. The liquid crystal display of claim 7, wherein the copolymer comprises a repeating unit represented by chemical formula (3):

Chemical Formula (3)

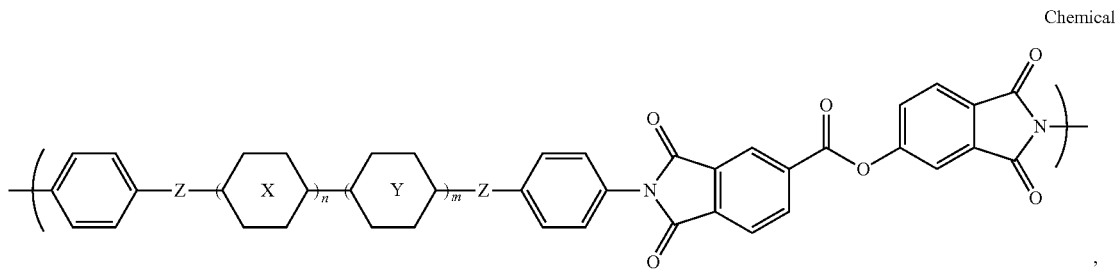

wherein Z, X, Y, n and m are identical to those in chemical formula (1).

12. A liquid crystal display comprising:
a first substrate and a second substrate facing each other;
a first alignment layer disposed on a surface of the first substrate facing the second substrate;
a second alignment layer disposed on a surface of the second substrate facing the first substrate; and
a liquid crystal layer interposed between the first substrate and the second substrate,
wherein at least one of the first alignment layer and the second alignment layer comprises a copolymer of a dianhydride compound and a diamine compound, comprising:
a repeating unit represented by chemical formula (1) and a repeating unit represented by chemical formula (2-2):

Chemical Formula (1)

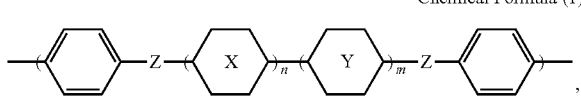

wherein
Z is an alkylene group comprising 2 to 8 carbon atoms,
X is an aromatic group comprising 6 to 30 carbon atoms or an alicyclic group comprising 4 to 20 carbon atoms,
Y is an alicyclic group comprising 4 to 20 carbon atoms or an aromatic group comprising 6 to 30 carbon atoms, n is 0 or 1, and
m is 1 or 0; and

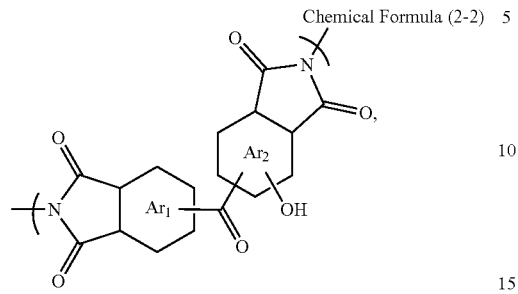

Chemical Formula (2-2)

wherein $Ar_1$ and $Ar_2$ are each independently an aromatic group comprising 6 to 30 carbon atoms.

13. The liquid crystal display of claim 12, wherein the copolymer further comprises a repeating unit of chemical formula (4-1):

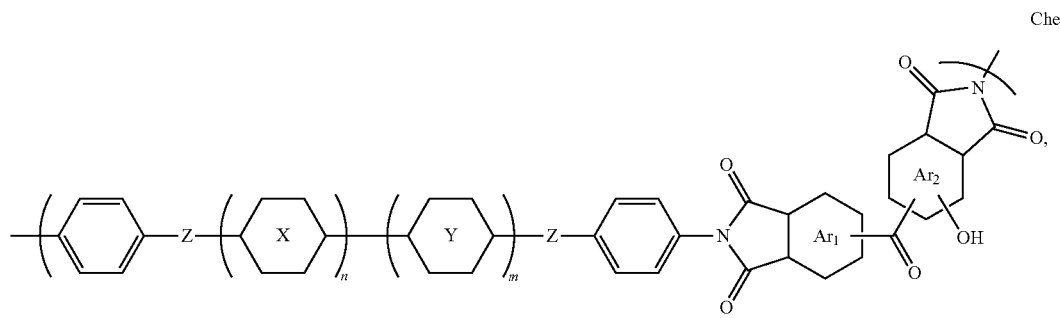

Chemical Formula (4-1)

wherein Z, X, Y, $R_1$, $Ar_1$, $Ar_2$, n and m are identical to those in chemical formula (3-1).

14. The liquid crystal display of claim 13, wherein the copolymer further comprises a repeating unit represented by chemical formula (4):

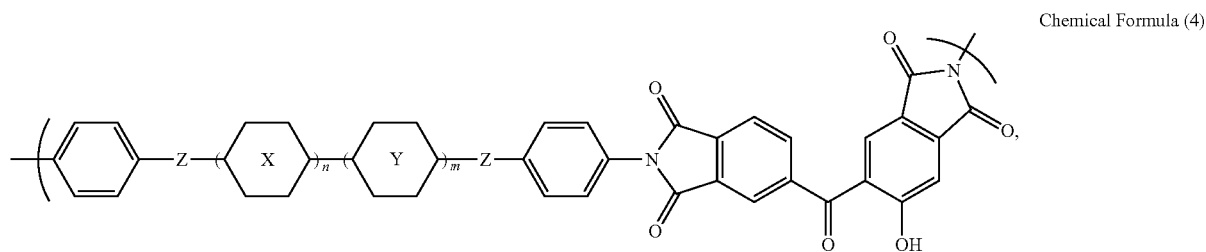

Chemical Formula (4)

wherein Z, X, Y, n and m are identical to those in chemical formula (1).

15. The liquid crystal display of claim 13, wherein the amount of the copolymer comprising a repeating unit of chemical formula (4-1) is from about 5 mole percent to about 30 mole percent based on the total amount of the repeating unit of chemical formula (3-1) and the repeating unit of chemical formula (4-1).

* * * * *